(12) United States Patent
Lukarski et al.

(10) Patent No.: US 12,097,875 B1
(45) Date of Patent: Sep. 24, 2024

(54) MAP GENERATION USING LOCALLY CAPTURED SENSOR DATA

(71) Applicant: Apple Inc., Cupertino, CA (US)

(72) Inventors: Dimitar H Lukarski, Sunnyvale, CA (US); Karsten Ahnert, Sunnyvale, CA (US); Sayanan V Sivaraman, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 17/814,191

(22) Filed: Jul. 21, 2022

Related U.S. Application Data

(60) Provisional application No. 63/225,290, filed on Jul. 23, 2021.

(51) Int. Cl.
| | |
|---|---|
| *B60W 40/06* | (2012.01) |
| *B60W 60/00* | (2020.01) |
| *G06V 10/764* | (2022.01) |
| *G06V 10/80* | (2022.01) |
| *G06V 20/56* | (2022.01) |

(52) U.S. Cl.
CPC ........ *B60W 60/001* (2020.02); *B60W 40/06* (2013.01); *G06V 10/764* (2022.01); *G06V 10/80* (2022.01); *G06V 20/588* (2022.01); *B60W 2420/403* (2013.01); *B60W 2420/408* (2024.01); *B60W 2555/60* (2020.02)

(58) Field of Classification Search
CPC ............... B60W 60/001; B60W 40/06; B60W 2555/60; B60W 2420/408; B60W 2420/403; G06V 10/764; G06V 10/80; G06V 20/588
See application file for complete search history.

(56) References Cited

U.S. PATENT DOCUMENTS 10,760,918 B2  9/2020  Fowe et al.
2015/0316386 A1  11/2015  Delp

FOREIGN PATENT DOCUMENTS

EP  1498694 A2  1/2005

*Primary Examiner* — Mathew Franklin Gordon
(74) *Attorney, Agent, or Firm* — Alexander A. Knapp; Kowert, Hood, Munyon, Rankin & Goetzel, P.C.

(57) ABSTRACT

A rules of the road module and database determines rules using information about segments identified from locally captured image data and observables identified in the image data.

22 Claims, 24 Drawing Sheets

MAP GENERATION USING LOCALLY CAPTURED SENSOR DATA

This application claims benefit of priority to U.S. Provisional Application Ser. No. 63/225,290, entitled "Map Generation Using Locally Captured Sensor Data," filed Jul. 23, 2021, and which is hereby incorporated herein by reference in its entirety.

BACKGROUND

Technical Field

This disclosure relates generally to systems and methods for generating driving rules, particularly where the driving rules are determined using locally captured sensor data.

Description of the Related Art

Motorized vehicles which are capable of sensing their environment and navigating to destinations with little or no ongoing input from occupants are an increasing focus of research and development. Such vehicles typically rely on pre-generated detailed maps for use in driving, wherein environmental data about objects in proximity to the vehicle, such as other vehicles, pedestrians, etc., is used in conjunction with driving rules in a pre-generated detailed map to determine driving decisions. For example, such pre-generated detailed maps often include detailed information about intersection configurations, turning rules, speed limits, etc. However, such pre-generated detailed maps are labor intensive to create, often being annotated by hand, and may quickly become inaccurate as roads are modified, for example during construction, etc.

SUMMARY OF EMBODIMENTS

According to some embodiments, a non-transitory computer-readable storage medium may store program instructions that when executed using one or more processors cause the one or more processors to receive information indicating lane segments, wherein the lane segments have been identified based on pieces of sensor data captured using one or more sensors and receive information indicating observables, wherein the observables have been identified based on the pieces of sensor data.

For example, in some embodiments, sensors of a vehicle, such as cameras, Lidar sensors, radar sensors, etc. capture sensor data as the vehicle is travelling. Also, computing devices of the vehicle process the captured sensor data to identify lane segments and observables. For example, a neural network implemented via a computing device of a vehicle may identify lane segments from images of upcoming sections of a road that is being travelled on by the vehicle. Also, a neural network and/or sensor fusion module implemented via a computing device of the vehicle may identify observables in proximity to the lane segments, such as road signs, stop signs, traffic lights, traffic instructions painted on the roadway, etc. These identified lane segments and observables may be provided to a rules of the road module that determines associations between the observables and the lane segments and further determines driving rules for the lane segments based on properties of the lane segments, such as width, length, curvature, connections to other lane segments, etc. and respective observables associated with the lane segments.

For example, the program instructions, when executed using the one or more processors further cause the one or more processors to determine associations between the lane segments and the observables, and determine, based on the lane segments and the associated observables, driving rules for the respective lane segments, wherein a driving rule for a given lane segment is determined based on one or more properties of the given lane segment and one or more observables associated with the given lane segment. Additionally, the program instructions cause the one or more processors to provide the determined driving rules for the respective lane segments to a decision engine for use in determining a course of action to take with regard to the respective lane segments.

According to some embodiments, a method comprises receiving information indicating one or more lane segments, wherein the one or more lane segments have been identified based on pieces of sensor data captured using sensors, for example of a vehicle. The method also includes receiving information indicating one or more observables, wherein the one or more observables have been identified based on the pieces of sensor data. The method further comprises determining associations between respective ones of the one or more lane segments and the one or more observables and determining, based on the one or more lane segments and the one or more associated observables, driving rules for the respective one or more lane segments, wherein a driving rule for a given lane segment is determined based on properties of the given lane segment and one or more observables associated with the given lane segment. The method further includes providing the determined driving rules for the respective one or more lane segments to a decision engine for use in determining a course of action to take with regard to the one or more respective lane segments.

According to some embodiments, a system comprises one or more computing devices configured to receive information indicating one or more lane segments, wherein the one or more lane segments have been identified based on pieces of sensor data captured using one or more sensors, for example of a vehicle. The one or more computing devices are also configured to receive information indicating one or more observables, wherein the one or more observables have been identified based on the pieces of sensor data. The one or more computing devices of the system are further configured to determine associations between respective ones of the one or more lane segments and the one or more observables; determine, based on the one or more lane segments and the one or more associated observables, driving rules for the respective one or more lane segments, wherein a driving rule for a given lane segment is determined based on one or more properties of the given lane segment and one or more observables associated with the given lane segment; and provide the determined driving rules for the respective one or more lane segments to a decision engine for use in determining a course of action to take with regard to the one or more respective lane segments.

Figure 1:
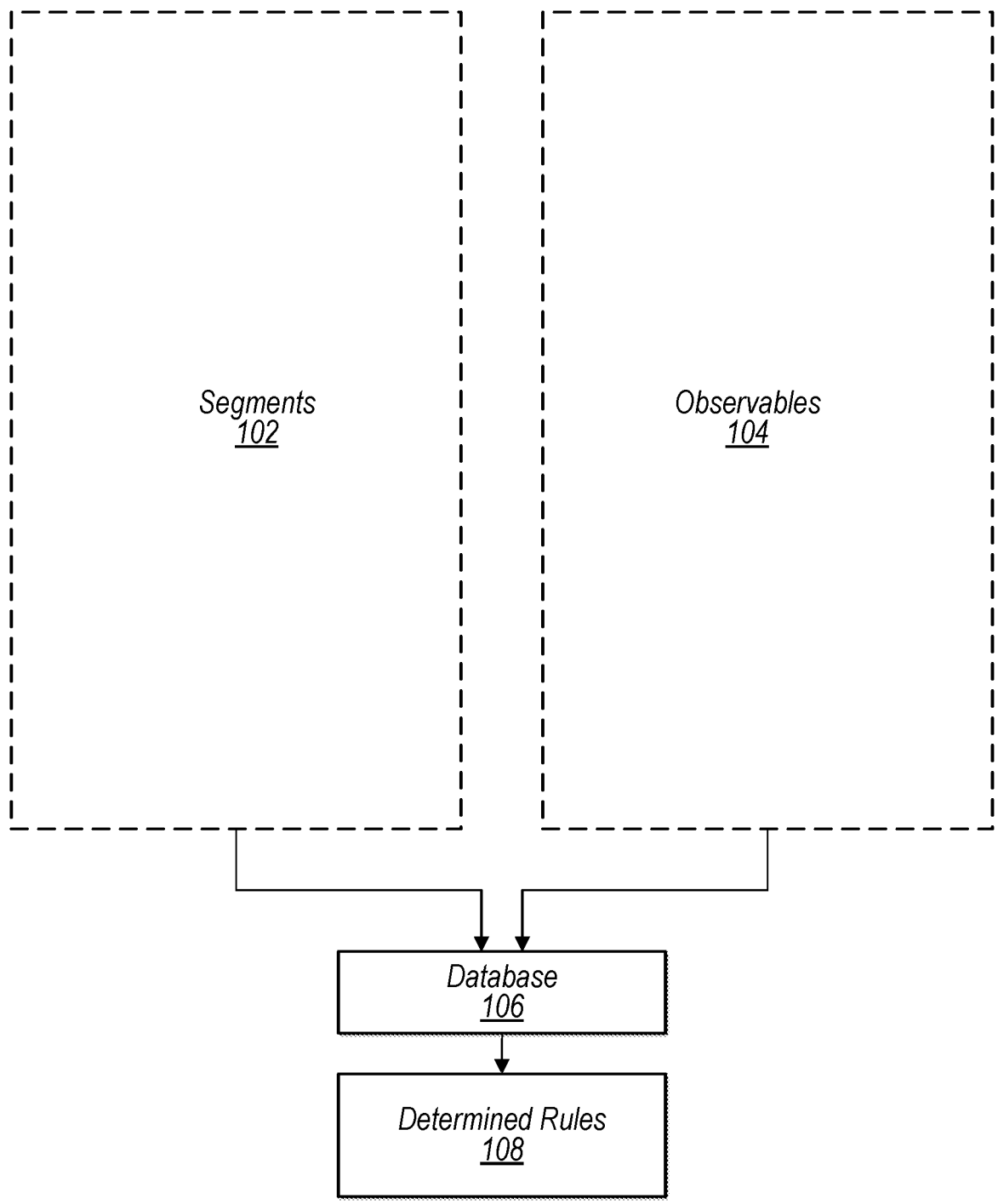
FIG. 1 illustrates a rules of the road module receiving lane segments and observables and the rules of the road module determining driving rules for the lane segments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

A rules of the road module, which may be implemented in software, such as via program instructions stored in a memory and executed using one or more processors, and/or which may be implemented in hardware is configured to determine driving rules for a vehicle as a vehicle traverses a path and/or nears an intersection comprising intersecting paths. In some embodiments, the rules of the road module determines the driving rules in real-time or near-real time using lane segments and observables, wherein the lane segments and observables are also determined in real time or near real time as the vehicle traverses the path and/or nears the intersection. In some embodiments, a path is made up of lane segments that are connected at edges of the lane segments.

In contrast to high-definition maps that may be used in other autonomous vehicle applications, a rules of the road map determined by a rules of the road module is generated in real-time, or near real-time, based on current road configurations. Thus, a rules of the road map determined by a rules of the road module is always up-to-date, whereas high-definition maps quickly become outdated as roads are modified, for example, due to construction, etc. Also, whereas high-definition maps are labor intensive to generate, often requiring human annotation and/or validation, a rules of the road map determined by a rules of the road module may be automatically generated without human intervention.

In some embodiments, a rules of the road module is implemented in an on-board computing device of a vehicle, such as an electronic control unit (ECU) of the vehicle. The rules of the road module is connected to upstream sensors and/or computing devices, such as other ECUs, that capture sensor data about a path a vehicle is traversing and analyze the sensor data to identify lane segments and observables. For example, a neural network implemented in a vehicle computing device, such as an ECU, may receive captured image data from one or more sensors of a vehicle, such as stereoscopic cameras, other cameras, LiDAR sensors, radar sensors, etc. The neural network may determine boundaries of a lane segment, for example, based on lane striping, changes in road surface, changes in road material, wear paths formed from previous vehicle traffic, etc. Additionally, the neural network and/or a sensor fusion module working in conjunction with the neural network may further identify observables proximate to the lane segments, such as traffic lights, ramp-control signals, stop signs, traffic signs, traffic instructions painted on a surface of a roadway, railroad crossing signs, speed-limit signs, crosswalk signs, yield signs, right-on-red (allowed or dis-allowed) signs, time restriction signs (e.g. school zone, right turn allowed/not allowed during specified hours, etc.), turn type signs, which may be on sign posts or painted on the roadway, such as left turn signs, straight arrow signs, right turn signs, protected left-turn signs, U-turn signs, etc., amongst various other types of observables that may be detected.

The rules of the road module associates the observables with lane segments, for example based on proximity of the observables to a given lane segment and/or an orientation of the observable relative to a given lane segment. In some embodiments, the rules of the road module implements its own deep neural network to determine associations between observables and lane segments or paths (comprising multiple lane segments). In some embodiments, a rules of the road module uses geometric heuristics to determine associations between observables and lane segments or paths. Also, in some embodiments, the provided observables and provided lane segments are time stamped using a synchronized timing mechanism such that the rules of the road module further determines associations between observables and lane segments based on temporal proximity.

Additionally, for intersecting lane segments forming an intersection, a rules of the road module determines input lane segments that allow vehicles to enter the intersection, output lane segments that allow vehicles to exit the intersection, and then determines paths through the intersection between the inputs and the outputs. In some embodiments, input lane segments having a common characteristic, such as entering the intersection from a same side, may be grouped into input bundles. Also, in some embodiments, output lane segments having a common characteristic, such as exiting the intersection on a same side or in a same direction, may be grouped into output bundles. Thus, in some embodiments, a rules of the road module may determine paths between input bundles and output bundles of an intersection and/or may determine paths between individual input lane segments and output lane segments of an intersection.

Also, in some embodiments, a rules of the road module may determine turning classifications for the determined paths through the intersection between input lane segments and/or input bundles and output lane segments and/or output bundles. For example, the rules of the road module may assign turning classifications to the paths based on configurations and orientations of the respective lane segments that form the paths through the intersection, such as a left-turn classification, a right-turn classification, a straight classification, a U-turn classification, etc. Note that a straight path through the intersection is included as one of the available turning classifications (e.g., a lack of turning).

The determined turning classification and/or observables determined for a given path, such as turning arrows painted on the roadway, traffic signs associated with traffic lights, etc., are used by the rules of the road module to determine a protected/non-protected status for the given path through the intersection. For example, a lane segment configuration wherein a subsequent lane segment is connected to a preceding lane segment at an edge via a left-side connection, may indicate a left turn. Furthermore, an observable painted on the roadway or an observable associated with a traffic light or traffic sign may further indicate that the left turn is a protected left turn or an un-protected left turn. Using this information about the given path and the observables associated with the given path, the rules of the road module may determine a relative priority for the determined turn classification, such as the left-turn path. Moreover, the rules of the road module may determine a relative priority for the path having the determined turn classification based on a current state of a variable-state observable, such as a left turn arrow traffic signal. Additionally, the rules of the road module may determine protected/non-protected statuses for other paths through the intersection and may assign relative priorities to all or some of the paths through the intersection. For example, the rules of the road module may determine that the left-turn path has a subordinate priority that is a lesser priority as compared to a superior priority associated with a straight path through the intersection for oncoming traffic. In some embodiments, the rules of the road module may determine relative priorities for a chosen path through the intersection and for any paths that intersect the chosen path. In this way, the rules of the road module may determine which path has a right of way to proceed through the intersection and under what circumstances should a vehicle in the chosen path yield to actors in other ones of the paths that intersect the chosen path. In some embodiments, the chosen path may be chosen by a separate navigation module of the vehicle that a route from a starting location (or current location) to a destination location.

The rules of the road module may then apply deterministic traffic rules stored in a memory of a computing device of the vehicle to determine a driving rule for traversing the given path having the determined turn classification and the determined relative priority as compared to any paths intersecting the given path. For example, a driving rule for the un-protected left turn may be to yield to on-coming traffic, but proceed through the intersection following the left turn path if there is not any oncoming traffic. In some embodiments, driving rules may be associated with edges of a lane segment, such as an edge that joins a straight lane segment leading up to an intersection with another lane segment that is connected to the straight lane segment via a left-side connection at an edge to form a left turn path through the intersection. Thus, the rules of the road module may assign a driving rule to the edge of the straight lane segment to be applied by a decision engine of the vehicle when reaching the end of the straight lane segment. For example, the rule assigned to the edge may be yield to oncoming traffic before proceeding according to the left turn path the lane segment connected via the left-side edge connection.

Exemplary rules of the road discussed herein are intended to aide in the description of embodiments of the present invention, which provides a framework for processing rules of the road. Implementers are reminded that specific rules of the road that apply to particular jurisdictions vary from jurisdiction to jurisdiction. For example, it is known that directions of roadway travel differ between jurisdictions. Likewise, speeds considered reasonable in one place may be considered excessive in another. Also, the possibility of making a right-turn at a red light may seem acceptable in some jurisdictions and unreasonable elsewhere. Implementers shall recognize that the actual rules of the road vary between implementations and/or locations in which the implementations operate. Indeed, implementers shall ensure that any implementation of the present technology complies with or exceeds relevant laws and practices regarding applicable rules of the road.

In some embodiments, a rules of the road module may further determine a permeability type for an edge. For example, two adjacent lane segments connected via left and right-side connections that route traffic in opposing directions may be assigned a non-permeable edge type, e.g., a vehicle is prohibited from leaving the lane segment into the adjacent lane segment comprising oncoming traffic. However, as another example, two adjacent lane segments connected via a left and right-side connection that route traffic in a same direction may be assigned a permeable lane segment classification with a subordinate priority. For example, a vehicle travelling in a first one of the lane segments may cross into the other one of the lane segments if another actor (e.g., vehicle, bicycle, person, etc.) is not proximately located in the adjacent lane segment relative to the vehicle (e.g., there is sufficient space to change lanes). Also, in some embodiments whether a right turn on red is allowed or dis-allowed may be communicated to a decision engine in a rules of the road map based on permeability classifications. For example, a straight lane segment connected to another lane segment via a right-side connection may be assigned a permeable classification if right turn on red is allowed and may be assigned a non-permeable classification if right turn on red is not allowed.

In some embodiments, priority relationships may comprise a superior priority, a subordinate priority, a conditional priority, and/or a lack or priority. A superior priority may have protected status to enter an intersection, such as a green light when travelling straight or a protected left turn arrow when turning left. A subordinate priority may have a right to enter the intersection if not interfering with another actor having a superior priority. For example, a vehicle turning left at an un-protected left turn traffic signal may have a subordinate priority. As another example, a vehicle turning right may have a subordinate priority, wherein bicycles or pedestrians in a crosswalk have a superior priority. Also, in some embodiments, a vehicle may have a conditional priority, such as at a stop sign, where the vehicle must first meet a condition (e.g., stopping) then determine priority relative to other actors, such as other vehicles that may have arrived at a four-way stop prior to the vehicle. Also, a vehicle may have a lack of priority, meaning the vehicle lacks a right to enter the intersection. For example, when at a red light and not turning right, or when at a red light and right-on-red is not allowed based on other observables a rules of the road module may determine that the vehicle has a lack of priority. As another example, a vehicle at a rail-road crossing may have a lack of priority when the crossing guard and/or lights are activated.

In some embodiments relative priorities may be simplified to three classifications instead of four, or some other number of relative priorities. For example, in some embodiments, priorities may be represented as no-priority (e.g., the vehicle must stop at the edge of the lane segment and under most circumstances cannot enter the intersection), a partial priority (e.g., the vehicle may enter the intersection without stopping, but must yield to all other actors in lane segments and/or paths with total priority), and a total priority (e.g., the vehicle is entitled to enter the intersection). In some embodiments, the relative priorities assigned to the paths and/or lane segments may be referred to as a right of way. In some embodiments, driving rules (e.g., actions to take) at the edges of lane segments may include actions such as must stop (e.g., stop at a stop sign or red light) and stop-if-able (e.g., stop at a yellow light if turning red).

In some embodiments, a permeability attribute assigned to an edge may distinguish between edges forming right turn paths that permit right on red and other right turn paths that do not allow right turn on red. For example, two lane segments connected via a right-side edge connection may be assigned a permeability to indicate acceptability of right turn on red. Furthermore, in locations wherein right turn on red is allowed or disallowed during specified hours as indicated via an observable, the permeability of the edge connection may be determined based on the observable and the current time.

In some embodiments, in order to determine paths through an intersection, index values may be assigned to input lane segments/input bundles and output lane segments/output bundles in a clock-wise or counter clock-wise direction around the intersection from the perspective of the vehicle approaching the intersection. In some embodiments, the organization of input and output bundles and associated ordered indices may be used by a machine learning algorithm and/or deep neural network to determine paths through the intersection. Also, in some embodiments, additionally, or alternatively, lane segment connections and configurations may be used by a machine learning algorithm and/or deep neural network to determine paths through an intersection.

In some embodiments, a machine learning algorithm determines observable types and states (for variable state observables). For example, raw sensor data may be mapped into a 3D bounding box representing a location of the observable in 3D space. The raw sensor data may be analyzed to determine an observable type and/or a current state of the observable. The raw sensor data may comprise time-synchronized LiDAR data and/or captured image data. The LiDAR data and the captured image data may be concatenated into a 3D or 4D tensor that is then evaluated via a deep neural network, in some embodiments. In some embodiments, the output of an observable detection module may include a 3D pose of the observable (for example relative to a lane segment), a size of the observable, an observable type, a current state of the observable, etc.

In some embodiments various techniques may be used to associate a determined observable with a given lane segment or a given path comprising multiple lane segments. For example, in some embodiments, associations may be learned, for example using a deep neural network. For example, the deep neural network may output a detected observable and an array of probabilities of association of the observable with various lane segments. For example, the output of the deep neural network may indicate that observable has a higher probability of being associated with lane segment 1, a lower probability of being associated with lane segment 2, etc. In some embodiments, the most probable lane segment observable association that exceeds a confidence threshold may be selected.

In some embodiments, geometric heuristics may be used an alternative to a deep neural network to determine associations between observables and lane segments and/or may be used to augment the deep neural network. In some embodiments, geometric heuristics may determine associations based on Euclidean distances in 3D space between the observables and the lane segments and/or based on orientation of the observable relative to the lane segment (e.g., the observable faces traffic travelling in a given lane segment or is directed toward traffic travelling in a different lane segment).

FIG. 1 illustrates a rules of the road module receiving lane segments and observables and the rules of the road module determining driving rules for the lane segments, according to some embodiments.

Rules of the road module and database 106 receives information indicating segments 102 (e.g., lane segments) and information indicating observables 104 (e.g., traffic signs, traffic lights, lane markings, etc.). The information indicating segments 102 may have been generated via a deep neural network, such as deep neural network 418 illustrated in FIG. 4. Also, the information indicating observables 104 may have been generated via a deep neural network and/or a machine learning or sensor fusion module, such as machine learning and/or sensor fusion module 420 also illustrated in FIG. 4.

In some embodiments, the information indicating segments 102 may include shapes and sizes of lane segments, such as lengths of the lane segments, widths of the lane segments, curvature of the lane segments, etc. In some embodiments, the lane segments may be indicated as two-dimensional shapes. In some embodiments, the information indicating segments 102 may further include information indicating connectivity relationships between lane segments at edges of the lane segments. In some embodiments, the information indicating segments 102 may include timestamps indicating when sensor data used to determine the lane segments was captured. In some embodiments, timestamps used for the lane segments may be synchronized with time stamps associated with the observables included in information indicating observables 104.

In some embodiments, the information indicating observables 104 includes determined shapes of observables, sizes of observables, colors of observables, and/or writing on observables. In some embodiments, observables may include traffic signs, such as may be mounted on a post or displayed over a roadway, including speed limit signs, traffic intersection signs indicating turning information for various lanes of the intersection, signs indicating temporal traffic rules, such as different speed limits during school hours, different turning rules during peak traffic periods, etc. Observables may include fixed observables, such as a stop sign, or a variable state observable, such as a traffic light. Also, in some embodiments, observables may include painting on a surface of a roadway, such as a straight arrow sign, a left or straight arrow sign, a left turn only sign, a straight or right turn arrow sign, a right turn only sign, a U-turn sign, etc. In some embodiments, an observables characterization module 306, as illustrated in FIG. 3, may determine an observable type and/or current observable state based on the size, shape, color, writing, etc. indicated for the observable in information indicating observables 104.

The rules of the road module and database 106 may determine associations between the observables indicated in the information 104 and the lane segments indicated in information 102. For example, the rules of the road module and database 106 may determine associations between lane segments and observables using a deep neural network that learns probable associations based on a variety of factors, such as lane segment curvature, connection type, width, length, etc. Also, the deep neural network may learn associations based on temporal proximity, geometrical proximity, observable type (e.g., stop sign, speed limit sign, turning information sign, etc.), lane segment configurations, etc. In some embodiments, a geometric heuristic technique may be used to determine associations between lane segments and observables.

The rules of the road module and database 106 may further determine driving rules for lane segments based on observables associated with the respective lane segments and stored deterministic traffic rules. In the case of intersecting lane segments, a rules of the road module and database 106 may determine turning classifications for paths through the intersecting lane segments. Also, the rules of the road module and database 106 may determine relative priorities for the determined turning classifications, and further determine rights of way for a given path based on its priority relative to other paths that intersect the given path. Furthermore, based on the determined turning classification and determined relative priority, a rules of the road database 106 may determine a driving rule for traversing the given path through the intersection, such as proceeding through the intersection or yielding to others with a superior priority.

Figure 4:
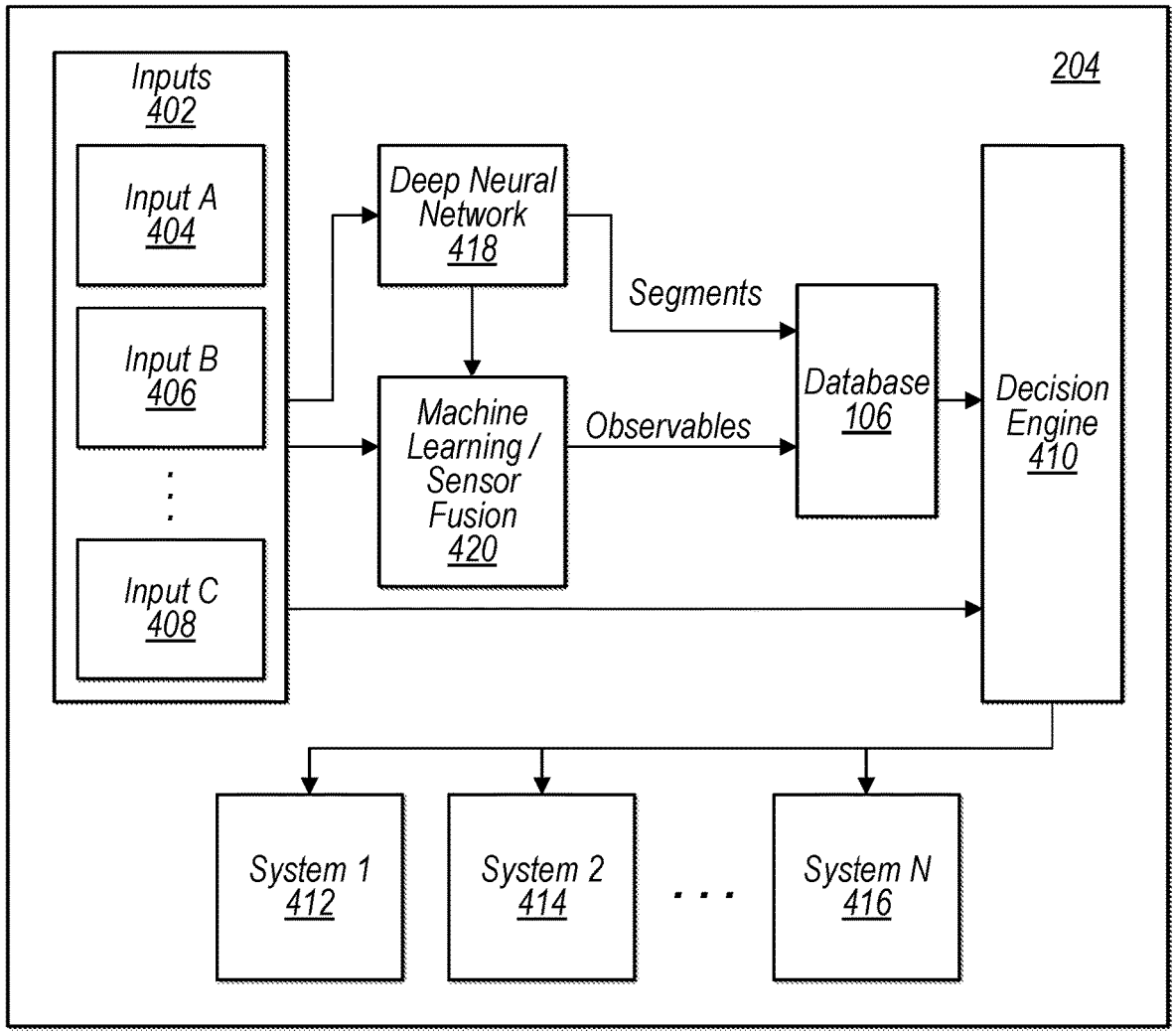
FIG. 4 is a block diagram of software components of a vehicle, wherein the components include a rules of the road module, according to some embodiments.

In some embodiments, rules of the road module and database 106 provides the determined driving rules to a downstream decision engine, such as decision engine 410 illustrated in FIG. 4. The determined driving rules may be represented as a rules of the road map, such as rules of the road map 202 illustrated in FIG. 2B. In some embodiments, the rules of the road map may be one of a plurality of inputs received by a decision engine, such as decision engine 410, wherein the decision engine 410 makes control decisions that are provided to vehicle control systems 412 through 416 to carry out a determined control decision. For example, in some embodiments, a rules of the road module and database 106 may provide a driving rule to decision engine 410 indicating that it is permissible to proceed through the intersection. However, the ultimate decision to proceed through the intersection or not may be made by decision engine 410. For example, even if a vehicle perceives a right to proceed through an intersection, decision engine 410 may nevertheless refrain from instructing vehicle control systems, such as a propulsion system or a steering system, to drive the vehicle through the intersection. For example, an obstacle may be in the intersection, another actor may be violating or likely to violate a traffic rule, so forth.

Figure 2A:
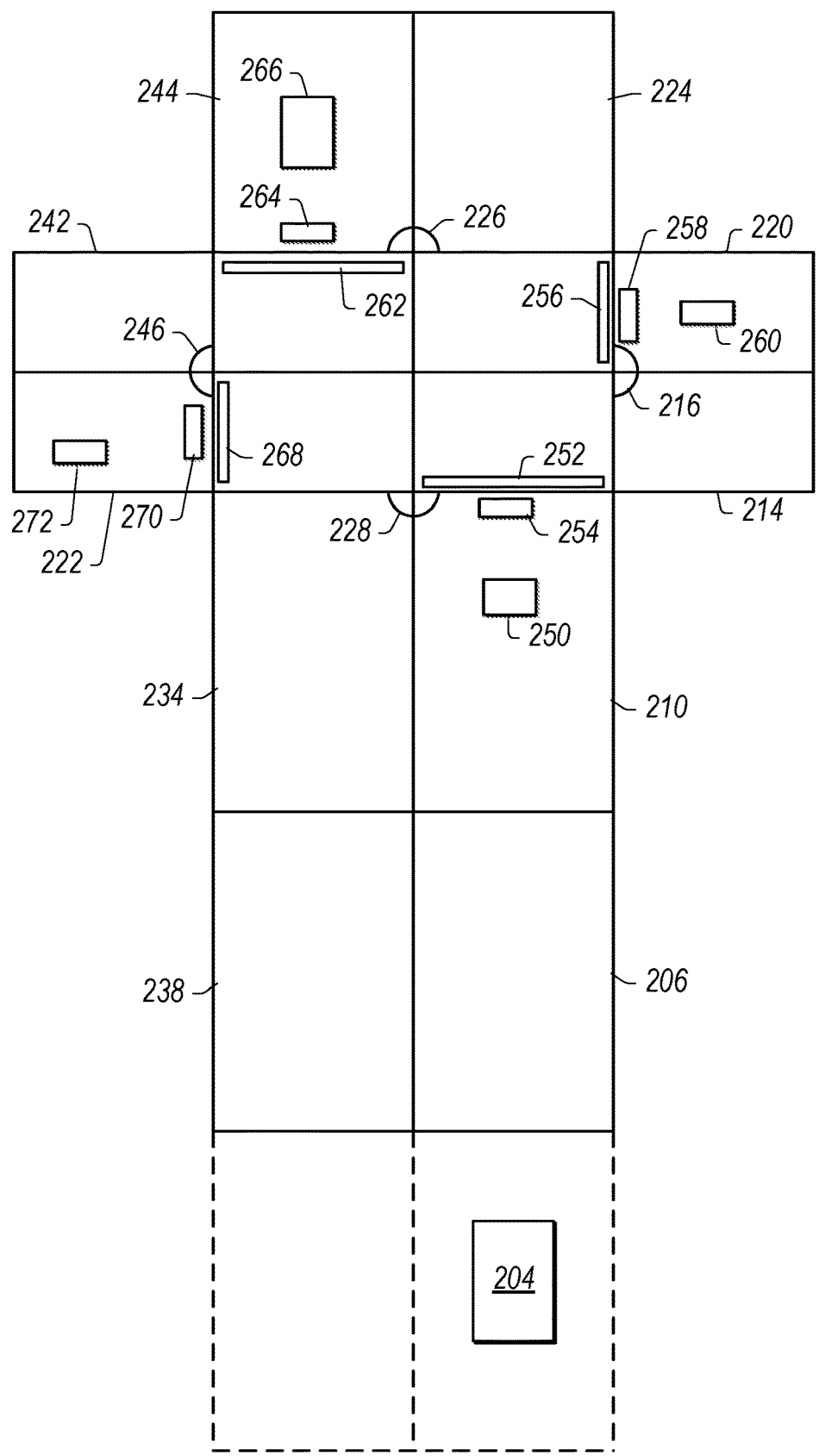
FIG. 2A illustrates a vehicle that includes a rules of the road module approaching an intersection made up of intersecting lane segments, wherein there are a plurality of observables also located proximate to the intersecting lane segments, according to some embodiments.

FIG. 2A illustrates a vehicle that includes a rules of the road module approaching an intersection made up of intersecting lane segments, wherein there are a plurality of observables also located proximate to the intersecting lane segments, according to some embodiments.

In some embodiments, a rules of the road module and database 106 may be included in a vehicle 204 as shown in FIG. 2A. Sensors of the vehicle 204, such as sensors 402, may capture sensor data as the vehicle is traversing a roadway. Also, a deep neural network 418 and a machine learning/sensor fusion module 420 of the vehicle may determine lane segments and observables as the vehicle is traversing the roadway. The determined lane segments and observables may be provided to a rules of the road module of the vehicle, such as rules of the road module and database 106. For example, the determined lane segments and observables may be provided to the rules of the road module as information indicating segments 102 and information indicating observables 104.

Figure 2B:
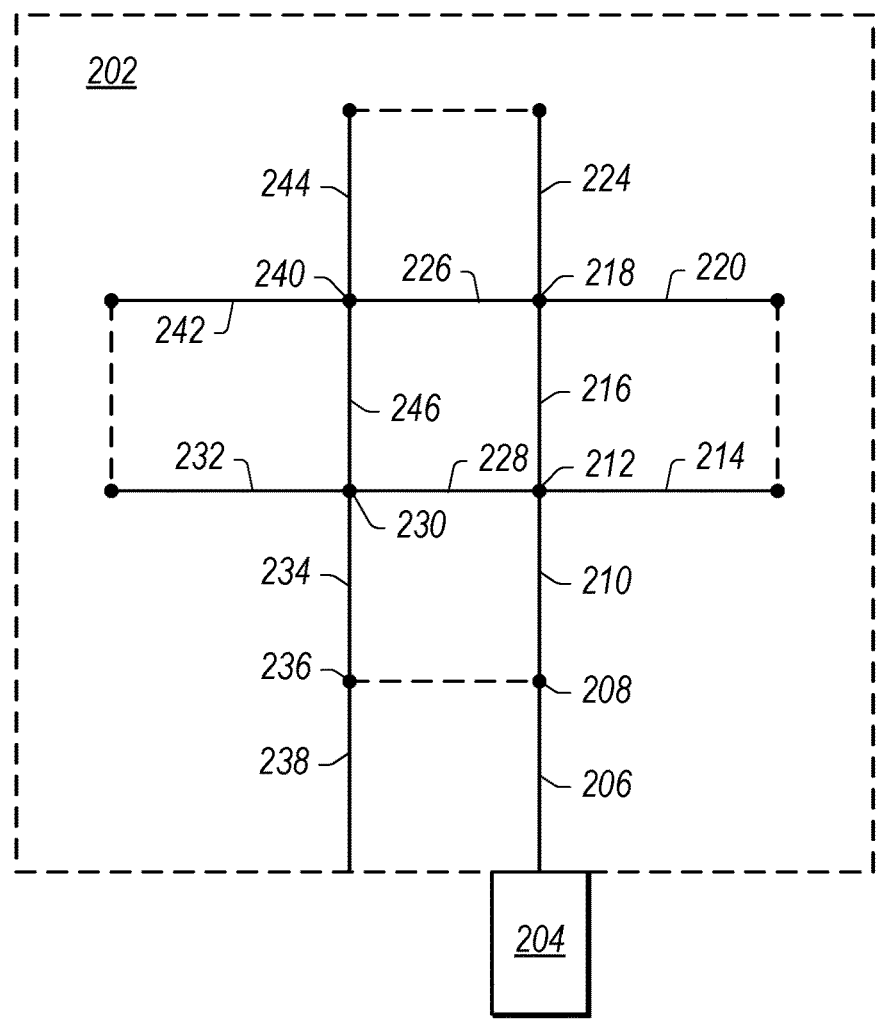
FIG. 2B illustrates an example rules of the road map generated by a rules of the road module, such as may be included in the vehicle of FIG. 2A, wherein driving rules are assigned to lane segments as attributes, and wherein the lane segments are joined together via edges, according to some embodiments.

FIG. 2A further illustrates an example set of lane segments and observables that may be used by a rules of the road module to generate a rules of the road map, such as rules of the road map 202 illustrated in FIG. 2B.

For example, sensors and a deep neural network of vehicle 204 may identify a proximate lane segment 206 which is connected to a lane segment 238 via a left side connection. Additionally, the sensors and deep neural network may identify a next lane segment 210 which is connected to lane segment 234 via a left side connection, and which has a next lane segment connection to lane segment 206. Note that the rules of the road module and database 106 of vehicle 204 may determine the left side connections between lane segments 206 and 230, and lane segments 210 and 234 are non-permeable connections, meaning that vehicle 204 is not allowed to enter into lane segments 238 or 234, which are reserved for traffic headed in an opposing direction.

Furthermore, sensors and a deep neural network of vehicle 204 may identify lane segment 228 which is perpendicular to lane segment 210 and which has a right-side connection to lane segments 234 and 210 and a left side connection to lane segment 226. (Note that these connection types may later be used by rules of the road module and database 106 to determine a turning classification for paths through the intersection.) Additionally, sensors and a deep neural network of vehicle 204 may identify lane segment 216 which intersects lane segments 228 and 226. Likewise, sensors and a deep neural network of vehicle 204 may identify lane segment 246 which intersects lane segments 226 and 228. Moreover, other connected lane segments 214, 220, 224, 244, 242, and 222 may be identified. Based on the various connectivities between the lane segments, as well as the orientations and configurations of the lane segments (e.g., perpendicular orientations, vertical orientations, and combined configurations of vertical and perpendicularly oriented lane segments), the rules of the road module and database 106 may determine turning classifications for paths through the intersection. In some embodiments, a machine learning model may be trained to recognize turning classifications based on lane segment sizes, shapes, orientations, configurations, etc.

Additionally, FIG. 2B shows observables, such as turning painting 250 indicating a left turn path, a straight path, and a right turn path which are permitted paths through the intersection from lane segment 210. Other observables include traffic light 254, painting 252 indicating an intersection boundary, etc. In some embodiments, sensors and a deep neural network and/or machine learning/sensor fusion module of vehicle 204 may identify various ones of the observables in view of vehicle 204, such as observables 250, 252, and 254. To the extent other ones of the observables such as observables 256, 258, and 260 are in view, these observables may also be identified by the sensors and the deep neural network and/or machine learning/sensor fusion module of vehicle 204. Similarly, to the extent they are in view, observables 262, 264, 266, 268, 270, and 272 may further be identified by the sensors and the deep neural network and/or machine learning/sensor fusion module of vehicle 204.

As discussed in regard to FIG. 1 and described in more detail herein, the determined lane segments and observables may be used by a rules of the road module and database 106 of vehicle 204 to determine driving rules, which may be presented, in some embodiments, as a rules of the road map 202 as shown in FIG. 2B.

For example, FIG. 2B illustrates an example rules of the road map generated by a rules of the road module, such as may be included in the vehicle 204 of FIG. 2A, wherein driving rules are assigned to lane segments as attributes, and wherein the lane segments are joined together via edges, according to some embodiments. For example, rules of the road map 202 may indicate that lane segment 206 is connected to lane segment 210 via a previous-next connection type and is also connected to lane segment 238 via a non-permeable left connection type. Also, lane segments 238 and 234 are indicated as connected via edge 236. At another end of lane segment 210, edge 212 connects lane segment 210 to lane segment 216 via a proximate-next connection type. Lane segment 228 is connected to lane segment 210 via a non-permeable left side connection type and lane segment 214 is connected to lane segment 210 at edge 212 via a permeable right side connection type. Various other edges are shown in FIG. 2B connecting the lane segments as shown in FIG. 2A, such as edges 218, 240, and 230. As mentioned above, the connection type and attributes assigned to the lane segments and edges of the lane segments shown in the rules of the road map 202 may be determined by a rules of the road module and database 106.

Figure 2C:
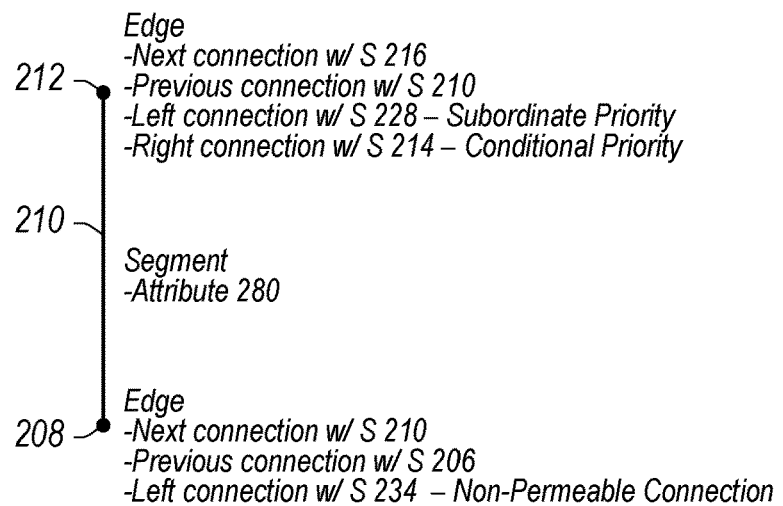
FIG. 2C illustrates a given lane segment of the rules of the road map of FIG. 2B, wherein driving rules are assigned to the given lane segment and edges indicate how the given lane segment connects to other lane segments of the rules of the road map, according to some embodiments.

FIG. 2C illustrates a given lane segment of the rules of the road map of FIG. 2B, wherein driving rules are assigned to the given lane segment and edges indicate how the given lane segment connects to other lane segments of the rules of the road map, according to some embodiments. In some embodiments, for respective ones of the lane segments, rules of the road map 202 may include assigned attributes and edge connection types. For example, for lane segment 210 an attribute 280, such as a speed limit, may be assigned to the lane segment. Also, at edge 212 connection types with lane segments 216, 228, and 214 may be specified, along with priorities for paths along these various lane segments. As another example, connection types with lane segments 206 and 234 are specified at edge 208.

Figure 3A:
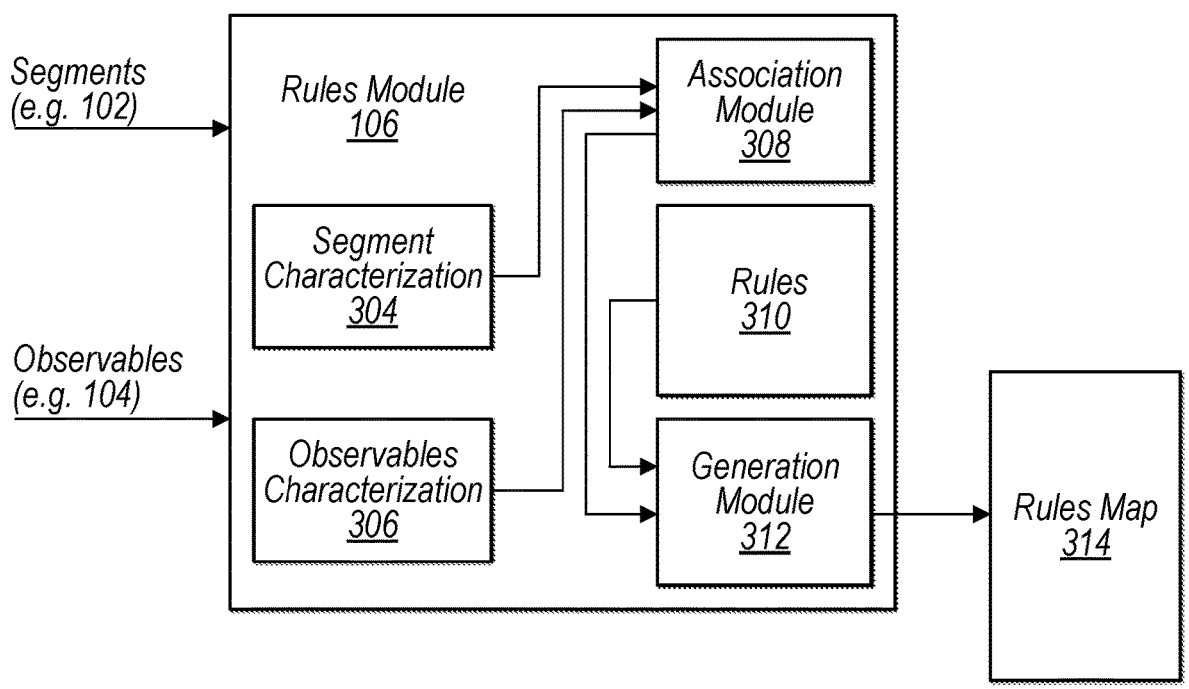
FIG. 3A is a block diagram of an example rules of the road module, according to some embodiments.

FIG. 3A is a block diagram of an example rules of the road module, according to some embodiments.

In some embodiments, a rules of the road module, such as rules of the road module and database 106, includes a lane segment characterization module 304, which may determine a width, length, size, curvature, etc. of a lane segment. Also, the lane segment characterization module 304 may determine an orientation of the lane segment and/or a configuration of the lane segment relative to other lane segments connected to a given lane segment. Additionally, a rules of the road module, such as rules of the road module and database 106, may include an observables characterization module 306. The observables characterization module 306 may determine a type of a given observable based on the shape, size, color, writing, etc. of the observable. Also, the observables characterization module 306 may determine a current state of a varying state observable, such as a current color (red, yellow, green) of a traffic light. The characterized lane segments and characterized observables may be provided to an association module 308 which determines associations between the lane segments and observables, as further described in FIGS. 3B and 3C, as a few examples. Respective characterized lane segments with associated observables may be provided to rule generation module 312, which may determine driving rules for the lane segments, for example using one or more processes as further described in FIGS. 16-17.

Figure 3B:
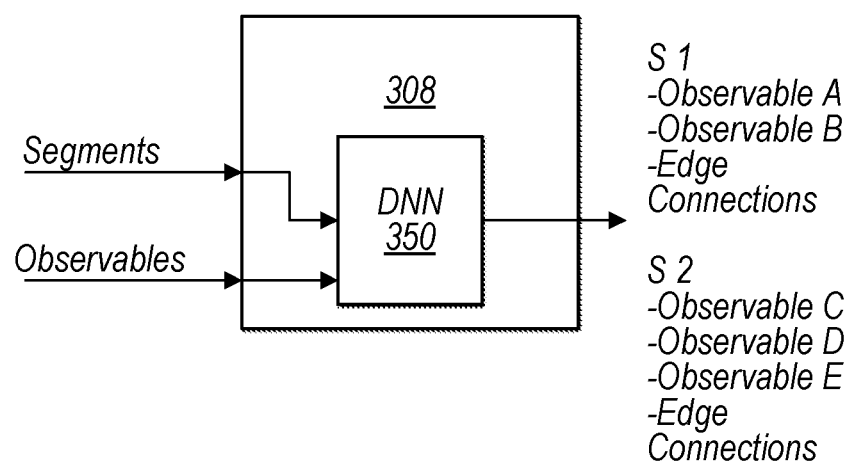
FIG. 3B is a block diagram of an example association module that may be included in a rules of the road module, according to some embodiments.

FIG. 3B is a block diagram of an example association module that may be included in a rules of the road module, according to some embodiments. In some embodiments, an association module of a rules of the road module, such as association module 308 includes a deep neural network, such as deep neural network 350. In some embodiments, deep neural network 350 may learn associations between lane segments having particular characteristics and observables having particular characteristics, wherein the characteristics also include space and time proximity as well as orientation relative to one another. For example, deep neural network 350 may output a detected observable and an array of probabilities of association of the observable with various lane segments.

Figure 3C:
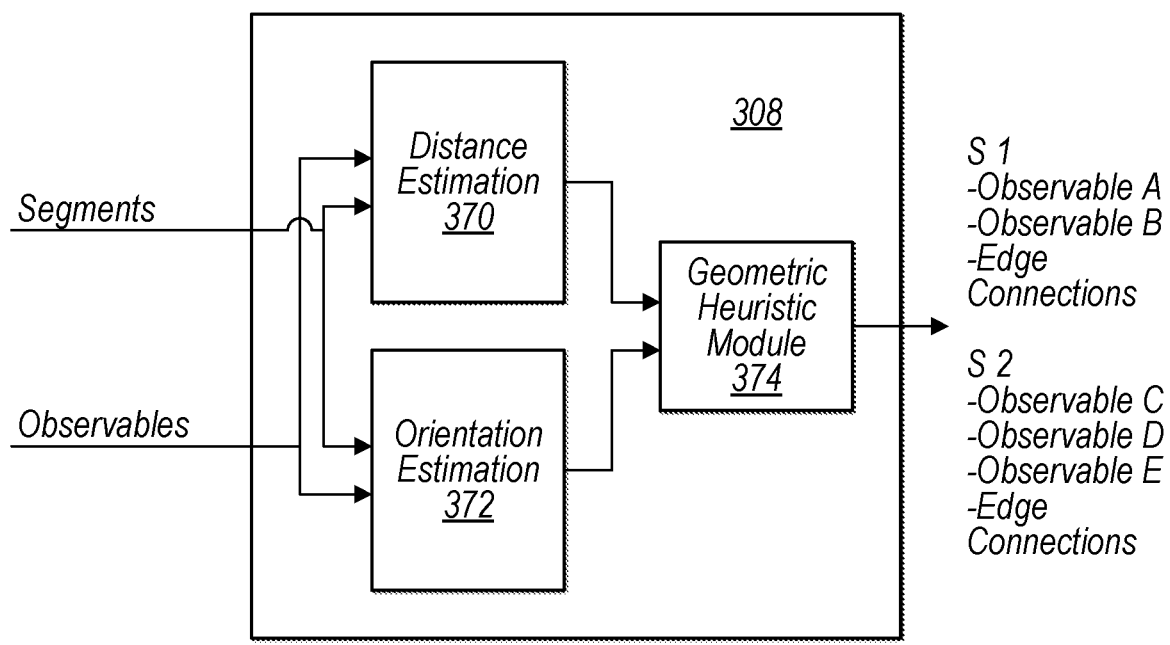
FIG. 3C is a block diagram of another example association module that may be included in a rules of the road module, according to some embodiments.

FIG. 3C is a block diagram of another example association module that may be included in a rules of the road module, according to some embodiments. In some embodiments, an association module of a rules of the road module, such as association module 308 may additionally or alternatively include a distance estimation module, such as observable to lane segment distance estimation module 370, an orientation estimation module, such as observable to lane segment orientation estimation module 372, and a geometric heuristic module, such as geometric heuristic module 374. In some embodiments, geometric heuristics module 374 may determine associations based on Euclidean distances in 3D space between the observables and the lane segments as determined by distance estimation module 370 and/or based on orientation of the observable relative to the lane segment (e.g., the observable faces traffic travelling in a given lane segment or is directed toward traffic travelling in a different lane segment) as determined by orientation estimation module 372.

FIG. 4 is a block diagram of software components of a vehicle, wherein the components include a rules of the road module, according to some embodiments. As discussed above, a rules of the road module and database 106 may be included in a vehicle 204, along with sensors 402, deep neural network 418, machine learning/sensor fusion module 420 and decision engine 410. The deep neural network 418, machine learning/sensor fusion module 420, rules of the road module and database 106 and decision engine 410 may be implemented on one or more computing devices of the vehicle 204, such as one or more ECUs of the vehicle. In some embodiments, sensors 402 may include cameras 404, which may include conventional cameras and/or stereoscopic cameras, LiDAR sensors 406, and/or other sensors 408. In some embodiments pieces of captured sensor data may be provided from sensors 502 to deep neural network 418 and machine learning/sensor fusion module 420. In some embodiments, output of the deep neural network 418 may additionally be provided to machine learning/sensor fusion module 420. Deep neural network 418 may identify lane segments and provide information indicating the identified lane segments to rules of the road module and database 106. Additionally, machine learning/sensor fusion module 420 may identify observables and provide information indicating the identified observables to rules of the road module and database 106. The rules of the road module and database 106 may determine driving rules, such as rules of the road map 202, and provide the determined driving rules to decision engine 410. The decision engine 410 may also receive sensor information and/or other information from other modules, such as the deep neural network 418, the machine learning/sensor fusion module 420, or other components of the vehicle. Based on these inputs the decision engine 410 may generate one or more control commands that are sent to vehicle control systems, such as vehicle controls systems 412, 414, and 416. For example, the vehicle control systems may include a propulsion system of the vehicle, a steering system of the vehicle, turning indicators of the vehicle, etc.

Figure 5:
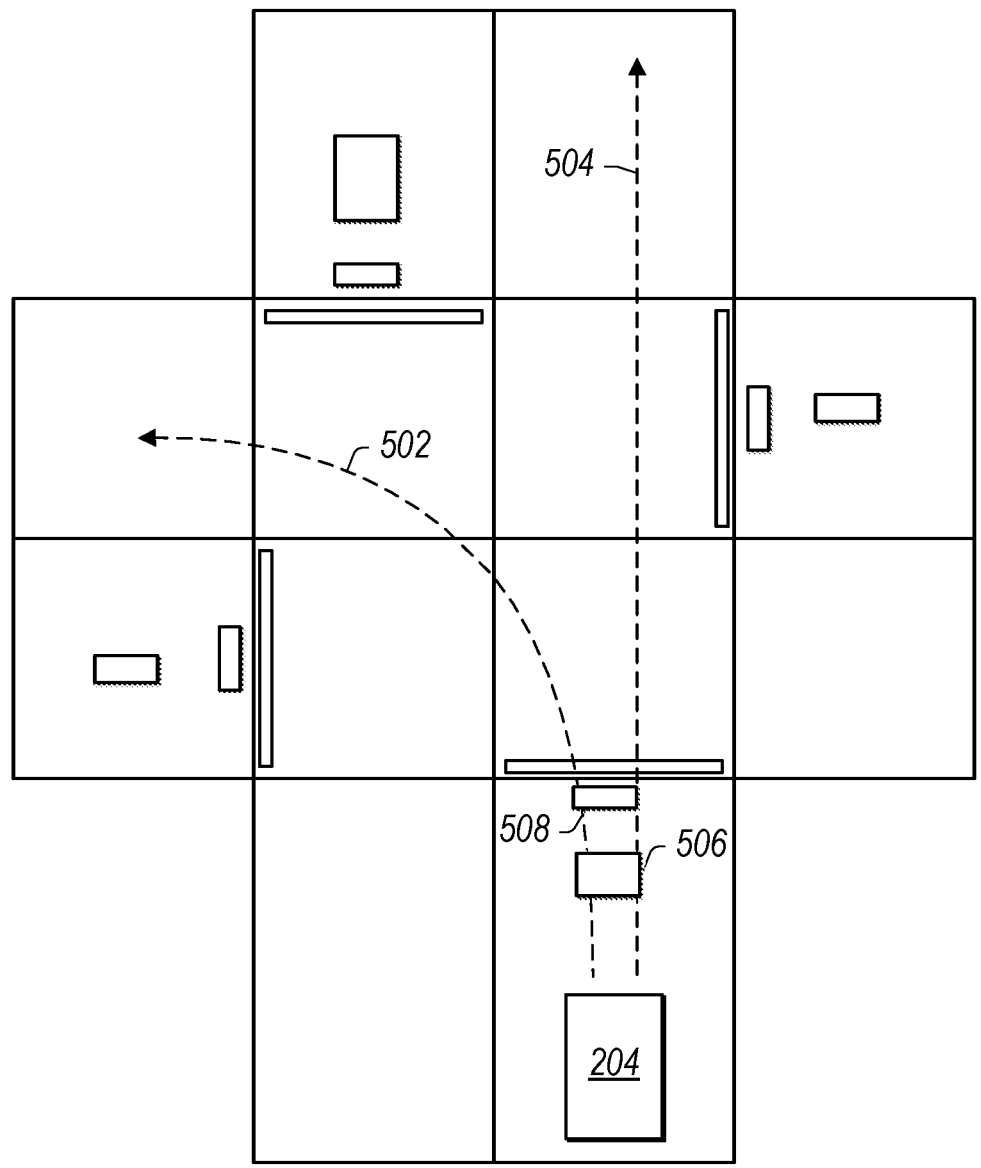
FIG. 5 is a top view of an intersection made up of intersecting lane segments and comprising observables, wherein a rules of the road module has determined a left turn path through the intersection has a subordinate priority, according to some embodiments.

FIG. 5 is a top view of an intersection made up of intersecting lane segments and comprising observables, wherein a rules of the road module has determined a left turn path through the intersection has a subordinate priority, according to some embodiments.

As an example, as vehicle 204 approaches an intersection, rules of the road module and database 106 may determine vehicle 204 has a subordinate priority for a left turn path 502 and a superior priority for a straight path 504. This determination may be based on the configuration of the lane segments and associated observables, such as road painting 506, and green light 508 without a protected left turn indication. Note that the subordinate priority path 502 may be associated with a driving rule that instructs the decision engine 410 to yield priority to oncoming traffic and to only proceed along the path 502 if other actors, such as other vehicles are not in or entering the intersection.

Figure 6:
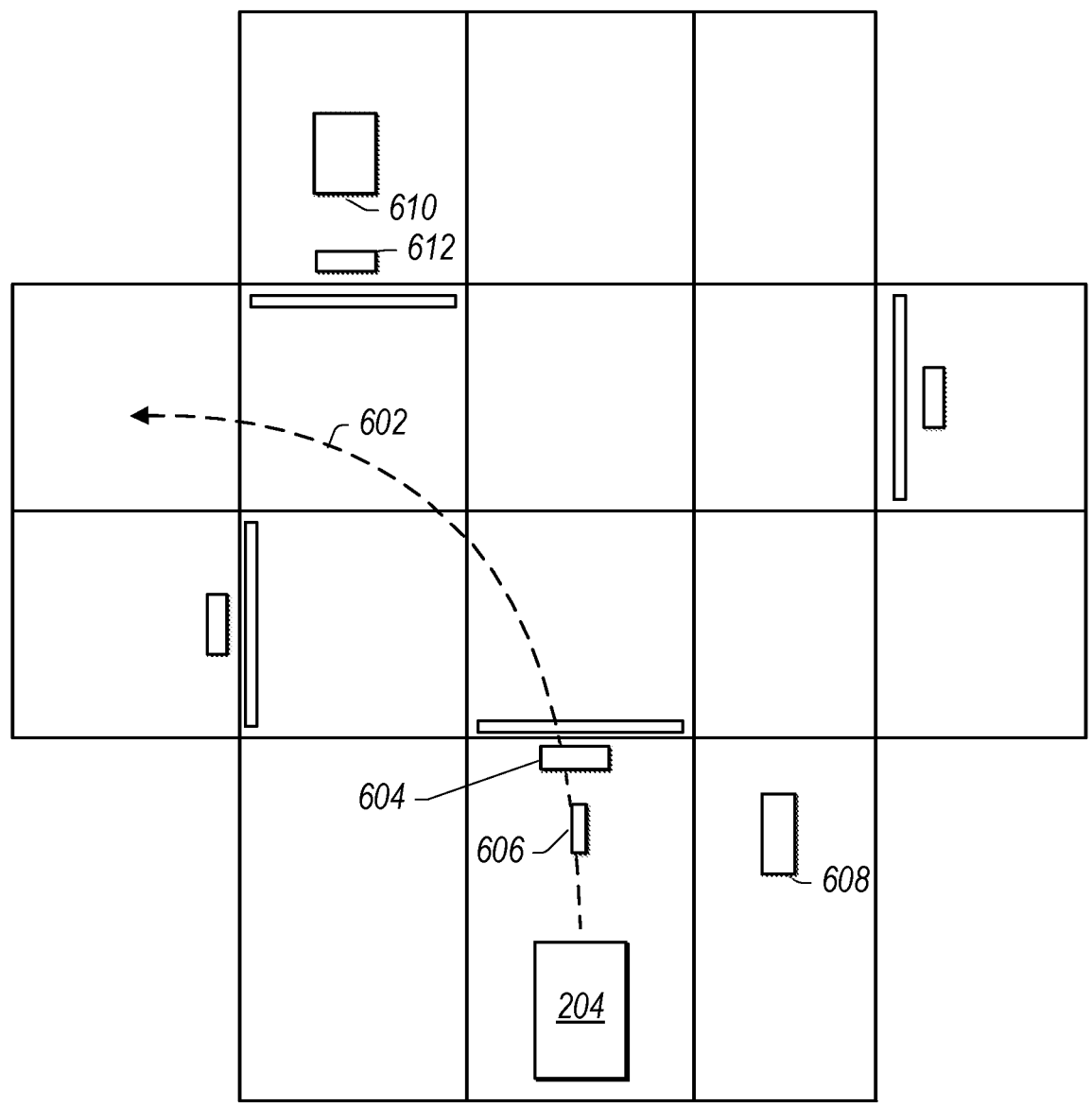
FIG. 6 is a top view of an intersection made up of intersecting lane segments and comprising observables, wherein a rules of the road module has determined a left turn path through the intersection has a superior priority, according to some embodiments.

FIG. 6 is a top view of an intersection made up of intersecting lane segments and comprising observables, wherein a rules of the road module has determined a left turn path through the intersection has a superior priority, according to some embodiments.

As another example, in FIG. 6 vehicle 204 may approach an intersection with a protected left turn signal 604 and a road painting 606 indicating a protected left turn, along with a road paining in an adjacent lane segment indicating that straight travel traffic and right turn traffic are segregated into the adjacent lane. Also, the rules of the road module may determine that road painting 610 and traffic light 612 associated with a lane segment intersecting left turn path 602 have a "red" light. Thus, the rules of the road module and database 106 of vehicle 204 may determine left turn path 602 has a superior priority.

Figure 7:
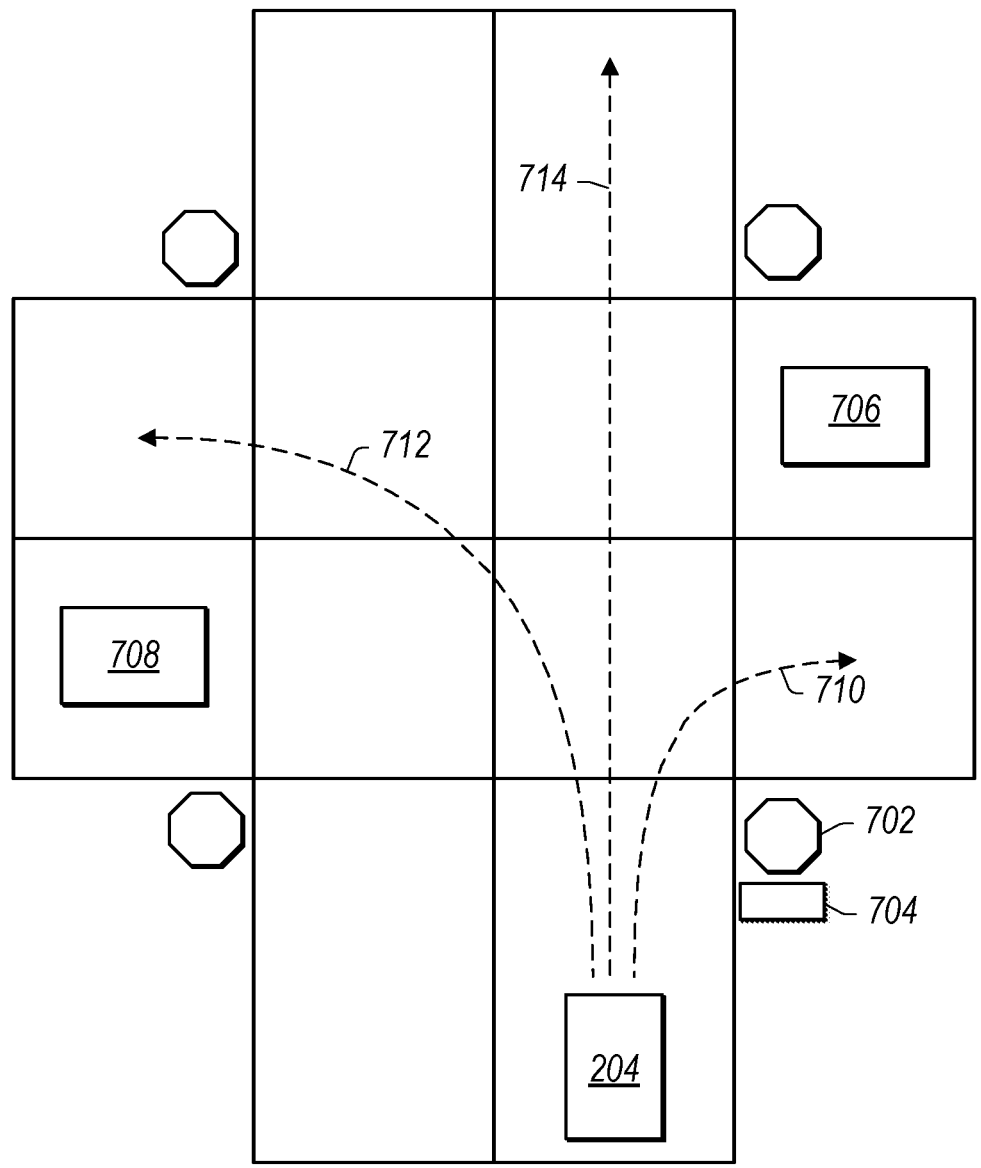
FIG. 7 is a top view of an intersection made up of intersecting lane segments and comprising observables, wherein a rules of the road module has determined a left turn path, straight path, or right turn path through the intersection have conditional priorities, according to some embodiments.

FIG. 7 is a top view of an intersection made up of intersecting lane segments and comprising observables, wherein a rules of the road module has determined a left turn path, straight path, or right turn path through the intersection have conditional priorities, according to some embodiments.

As yet another example, vehicle 204 may approach an intersection and may determine a left turn path 712, a straight path 714, and a right turn path 710 have a conditional priority based on observables such as a stop sign 702 and traffic rules sign 704 indicating a four-way stop. Additionally, rules of the road module and/or decision engine 410 may determine a conditioned priority for vehicle 204 relative to vehicles 706 and 708 based on a time sequence in which vehicles arrived at the four-way stop prior to vehicle 204.

Figure 8:
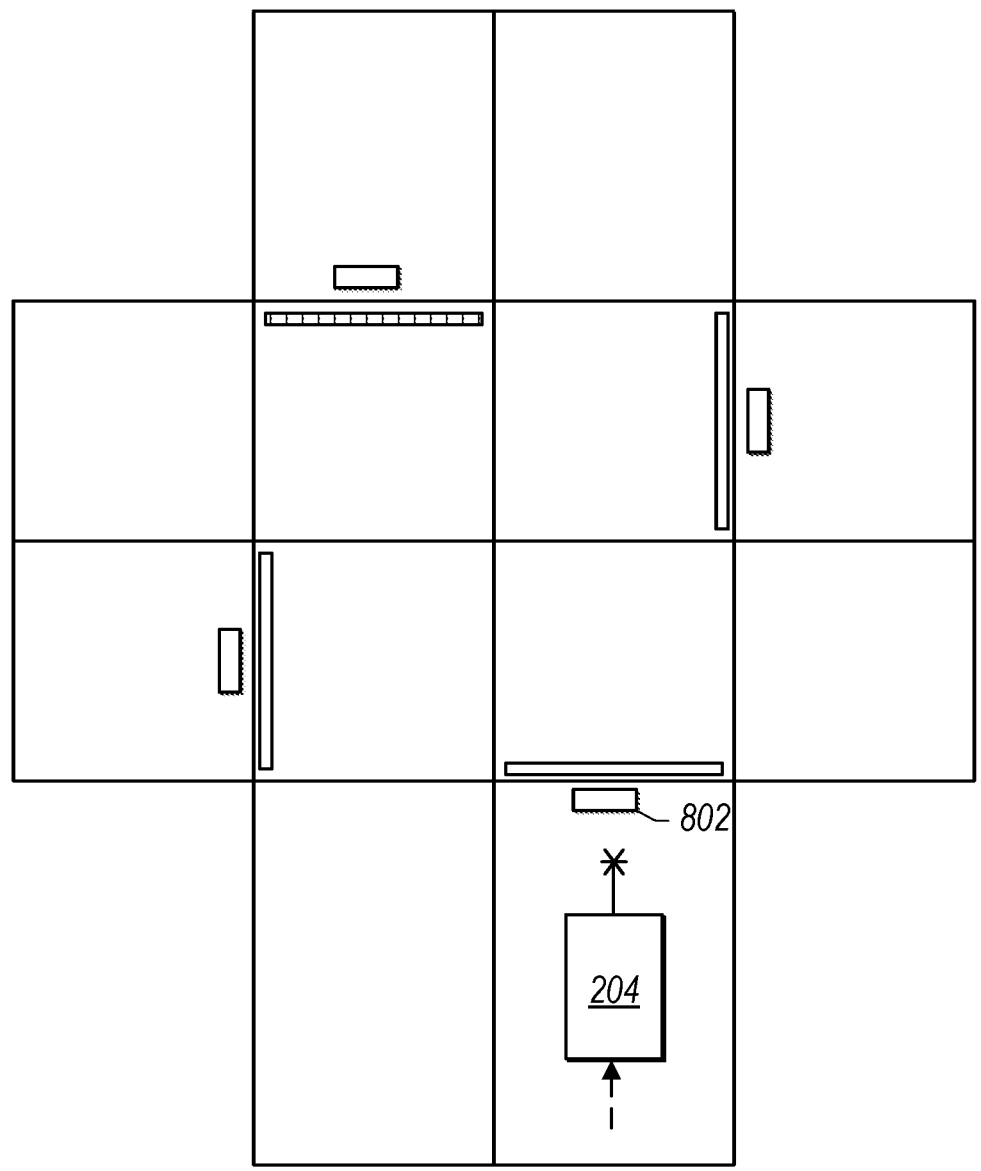
FIG. 8 is a top view of an intersection made up of intersecting lane segments and comprising observables, wherein a rules of the road module has determined a vehicle in a given lane segment lacks priority to enter the intersection based on current observables, according to some embodiments.

FIG. 8 is a top view of an intersection made up of intersecting lane segments and comprising observables, wherein a rules of the road module has determined a vehicle in a given lane segment lacks priority to enter the intersection based on current observables, according to some embodiments. In another example, a rules of the road module and database 106 may determine vehicle 204 has a lack of priority to enter an intersection, for example based on observable 802 indicating a "red" light.

Input and Output Bundling and Path Bundling

Figure 9:
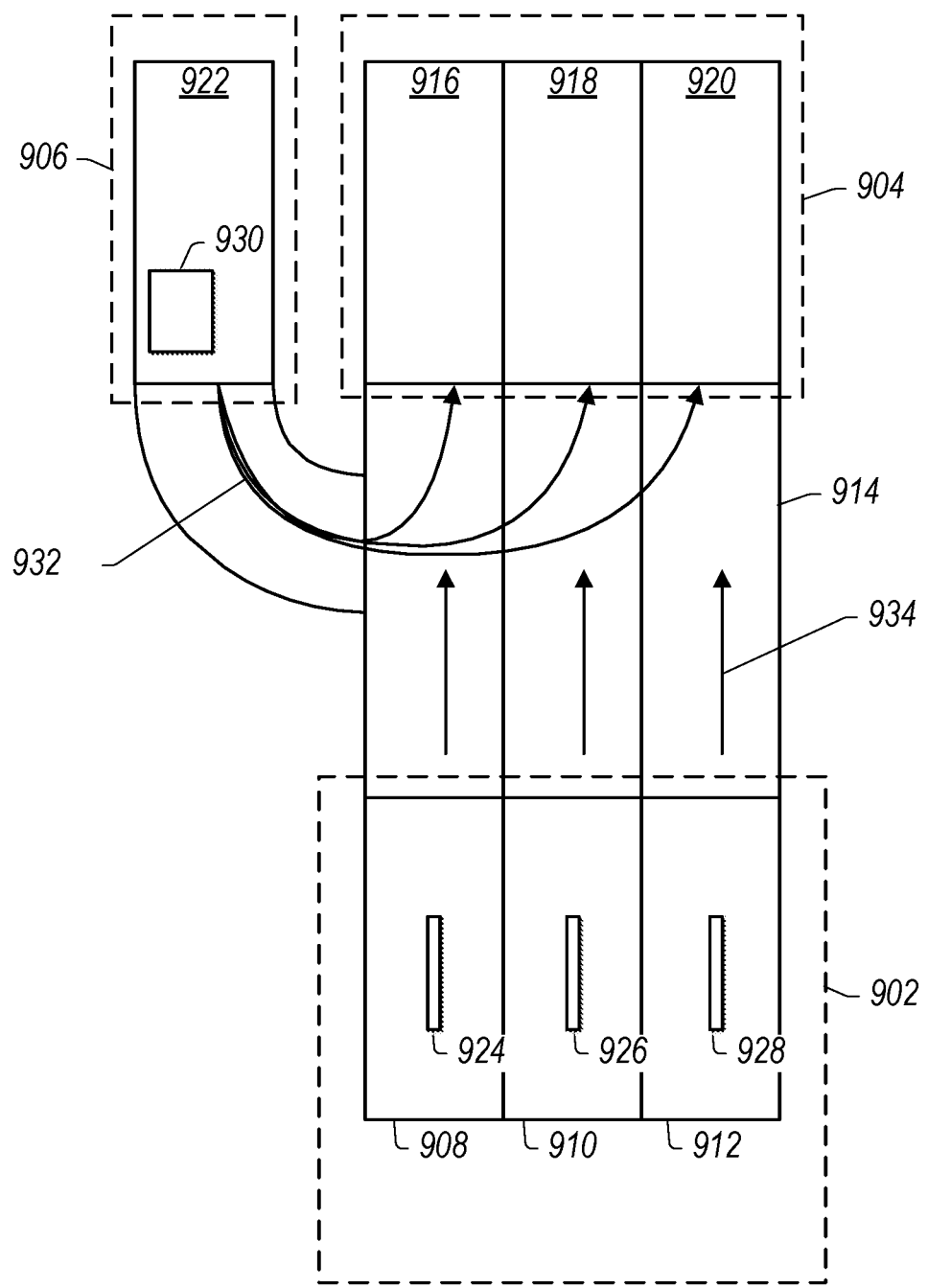
FIG. 9 is a top view of an intersection illustrating lane segments that have been grouped into input two input bundles and an output bundle by a rules of the road module, according to some embodiments.

In some embodiments, a rules of the road module and database 106 may determine bundles of inputs and outputs for an intersection as a preliminary step in determining turning classifications for paths through the intersection. For example, FIG. 9 is a top view of an intersection illustrating lane segments that have been grouped into input two input bundles and an output bundle by a rules of the road module, according to some embodiments. In some embodiments, lane segments 908, 910, and 912 entering intersection 914 may be grouped into a first input bundle 902. Also, lane segment 922 may be grouped into a second input bundle 906. Additionally, lane segments 916, 918, and 920 may be grouped into a first output bundle 904. The rules of the road module may then determine paths through the intersection 914 between input bundles and output bundles, based at least in part, on orientations of the relative bundles and/or observables associated with lane segments included in the bundles, such as straight arrow paths 924, 926, and 928 associated with lane segments 908, 910, and 912 included in input bundle 902, and U-turn arrow 930 associated with lane segment 922 of input bundle 906. Based on this information, the rules of the road module may determine turning classifications for paths through intersection 914, such as U-turn paths 932 and straight paths 934.

Figure 10:
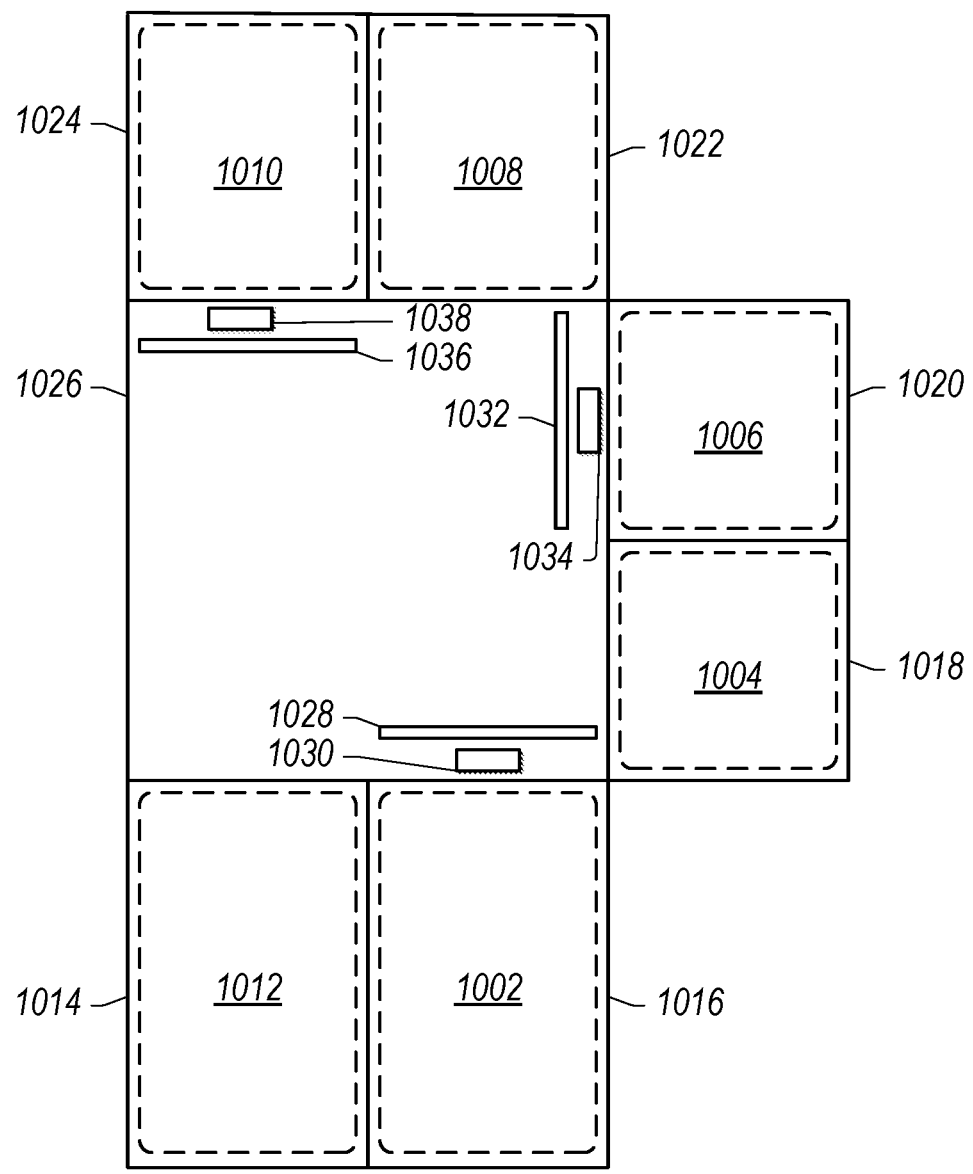
FIG. 10 is a top view of an intersection illustrating lane segments that have been grouped into three input bundles and three output bundles by a rules of the road module, according to some embodiments.

FIG. 10 is a top view of an intersection illustrating lane segments that have been grouped into three input bundles and three output bundles by a rules of the road module, according to some embodiments. In some embodiments, numbers and orientations of inputs and outputs to an intersection may vary. Also in some embodiments, each lane segment may constitute its own input bundle or output bundle. For example, in FIG. 10, intersection 1026 comprises input bundle 1002 which includes lane segment 1016, output bundle 1004 which includes lane segment 1018, input bundle which 1006 includes lane segment 1020, output bundle 1008 which includes lane segment 1022, input bundle 1010 which includes lane segment 1024, and output bundle 1012 which includes lane segment 1014. In some embodiments, a rules of the road module may distinguish between input bundles and output bundles based on lane segment configuration, orientation, and/or associated observables, such as traffic lights 1030, 1034, and 1038, and intersection boundary roadway paintings 1028, 1032, and 1036. For example, traffic lights may be associated with input lane segments, but not output lane segments.

Figure 11:
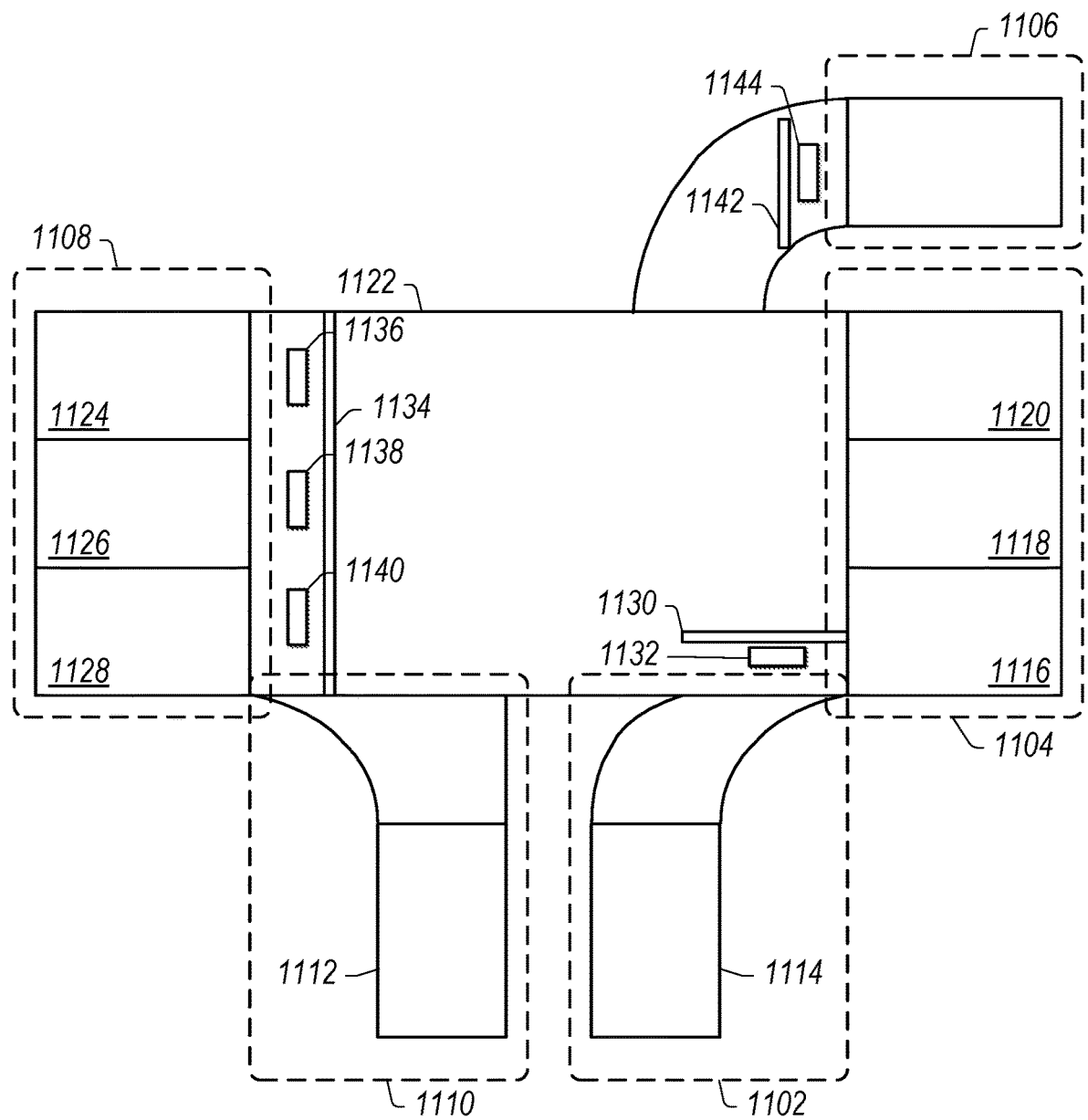
FIG. 11 is a top view of an intersection illustrating lane segments that have been grouped into three input bundles and two output bundles by a rules of the road module, according to some embodiments.

FIG. 11 is a top view of an intersection illustrating lane segments that have been grouped into three input bundles and two output bundles by a rules of the road module, according to some embodiments. In some embodiments, a rules of the road module may bundle some inputs or outputs into multi-lane segment bundles and other inputs or outputs into single lane segment bundles. For example, in FIG. 11 lane segments bordering intersection 1122 include lane segment 1114 grouped into input bundle 1102, lane segments 1116, 1118, and 1120 grouped into output bundle 1104, single lane segment 1106 grouped into input bundle 1106, lane segments 1124, 1126, and 1128 grouped into input bundle 1108, and lane segment 1112 grouped into output bundle 1112. In some embodiments, whether a given lane segment is an input or an output to intersection 1122 may further be determined based on observables 1130, 1132, 1134, 1136, 1138, 1140, 1142, and 1144.

Figure 12:
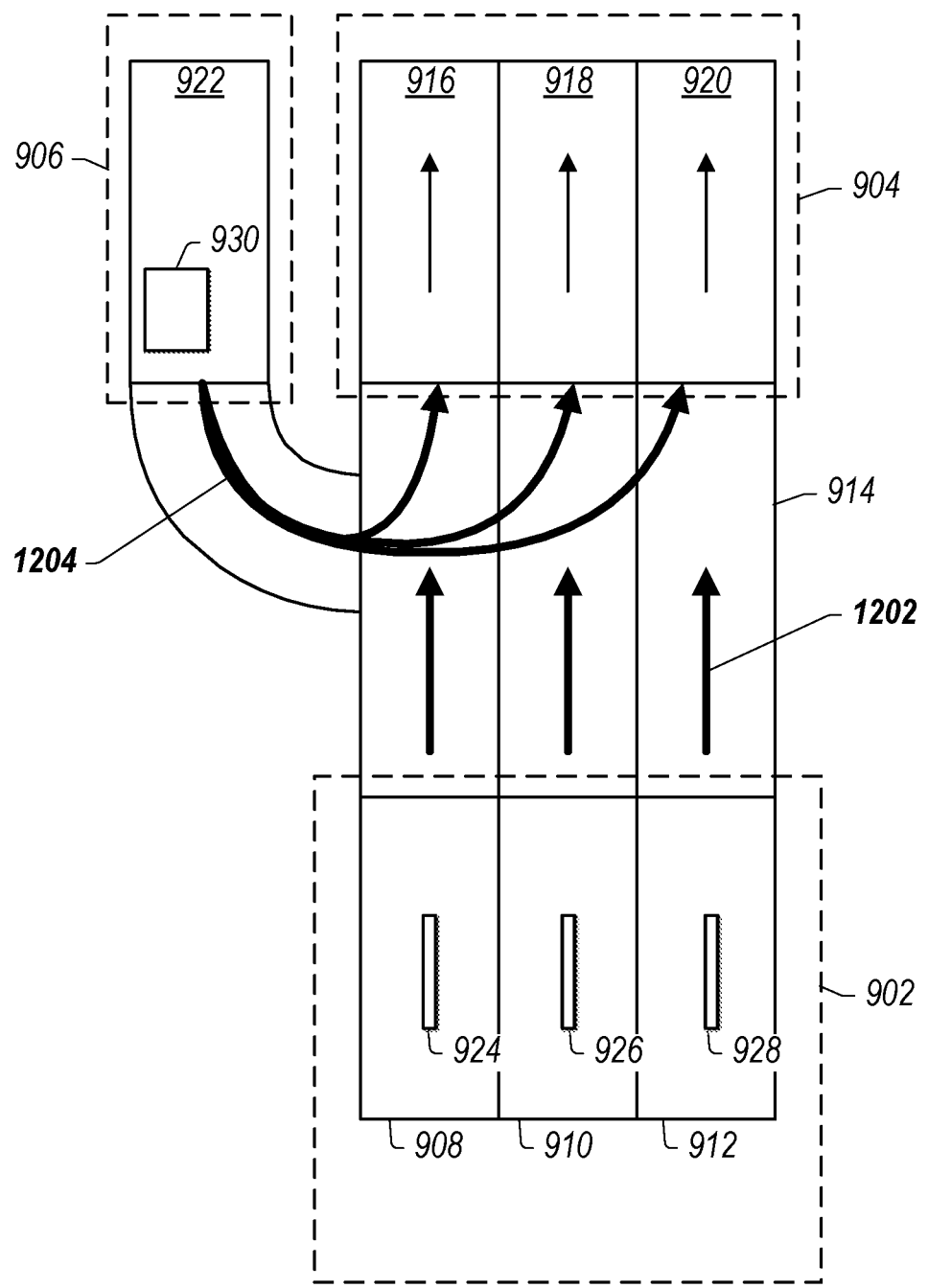
FIG. 12 is a top view of an intersection illustrating paths through the intersection between input bundles and output bundles, wherein the paths have been grouped into two path bundles and have been assigned relative priorities by a rules of the road module, according to some embodiments.

FIG. 12 is a top view of an intersection illustrating paths through the intersection between input bundles and output bundles, wherein the paths have been grouped into two path bundles and have been assigned relative priorities by a rules of the road module, according to some embodiments.

In some embodiments, a rules of the road module may determine paths through an intersection, such as intersection 914, wherein the paths comprise connected lane segments. In some embodiments, sets of lane segments included in a same input bundle that are connected a same output bundle may be grouped to determine a path bundle. For example, FIG. 12 indicates a determined path bundle 1 (1202) between input bundle 902 and output bundle 904 and a second path bundle (1204) between input bundle 906 and output bundle 904. Note that a given input bundle or a given output bundle may be included in multiple paths through a given intersection.

Figure 13:
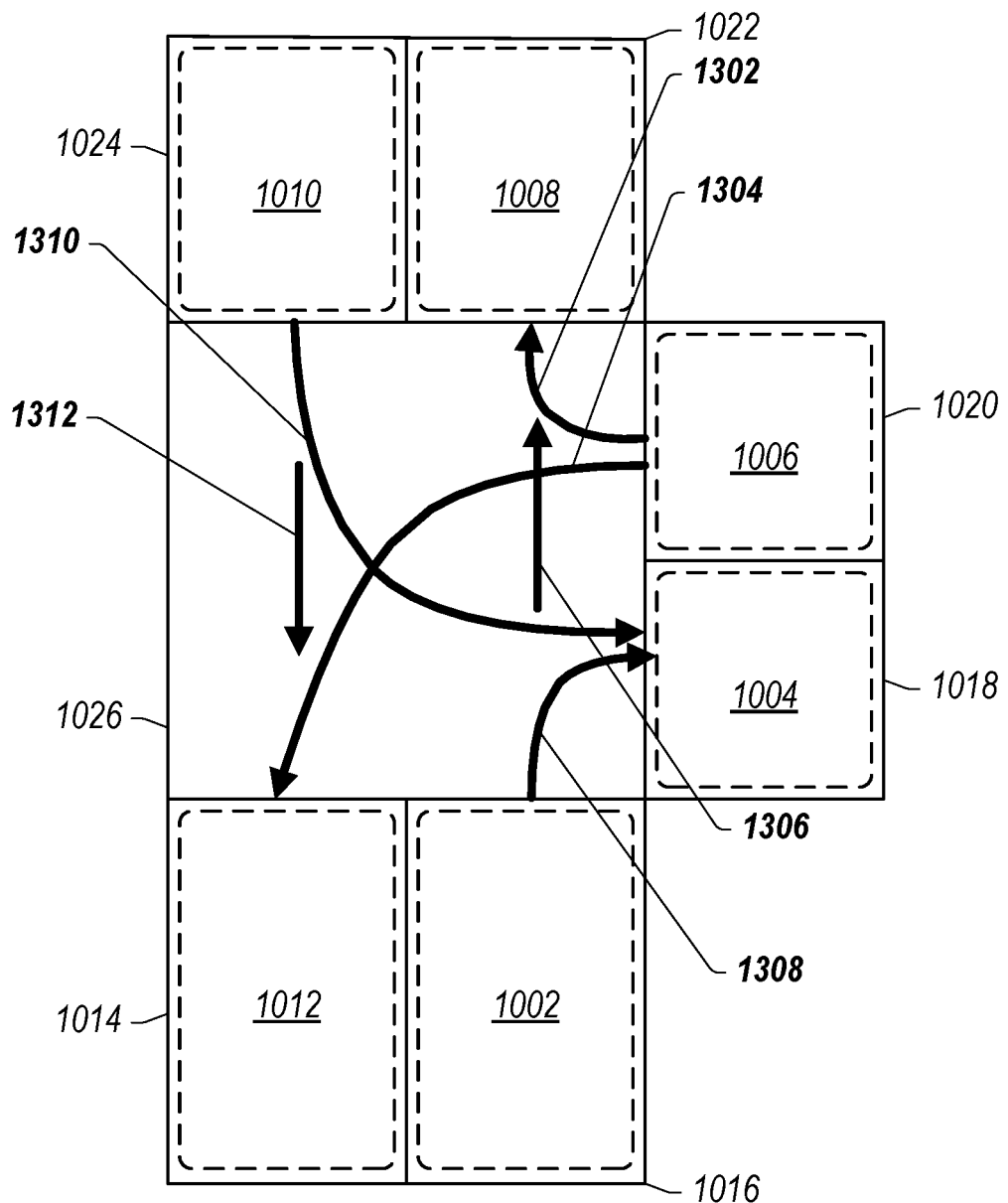
FIG. 13 is a top view of an intersection illustrating paths through the intersection between input bundles and output bundles, wherein the paths have been grouped into six different path bundles and have been assigned relative priorities by a rules of the road module, according to some embodiments.

FIG. 13 is a top view of an intersection illustrating paths through the intersection between input bundles and output bundles, wherein the paths have been grouped into six different path bundles and have been assigned relative priorities by a rules of the road module, according to some embodiments. As another example, a rules of the road module may determine path bundles 1-6 (e.g., 1302, 1304, 1306, 1308, 1310, and 1312) through the intersection 1026.

Figure 14:
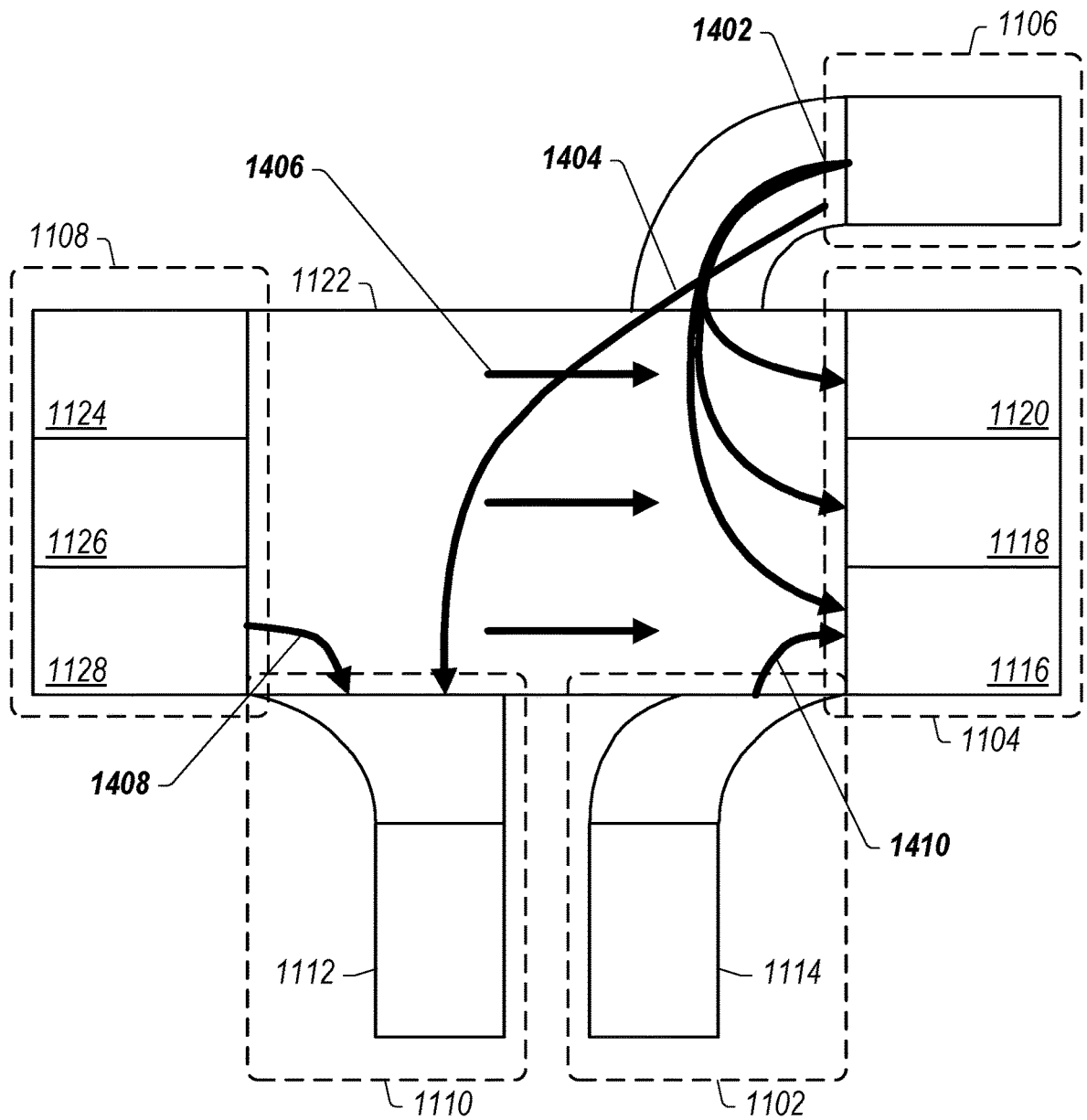
FIG. 14 is a top view of an intersection illustrating paths through the intersection between input bundles and output bundles, wherein the paths have been grouped into five different path bundles and have been assigned relative priorities by a rules of the road module, according to some embodiments.

FIG. 14 is a top view of an intersection illustrating paths through the intersection between input bundles and output bundles, wherein the paths have been grouped into five different path bundles and have been assigned relative priorities by a rules of the road module, according to some embodiments. As yet another example, a rules of the road module may determine path bundles 1-5 (e.g., 1402, 1404, 1406, 1408, and 1410) through intersection 1122.

Example Rule Visualization Module

Figure 15:
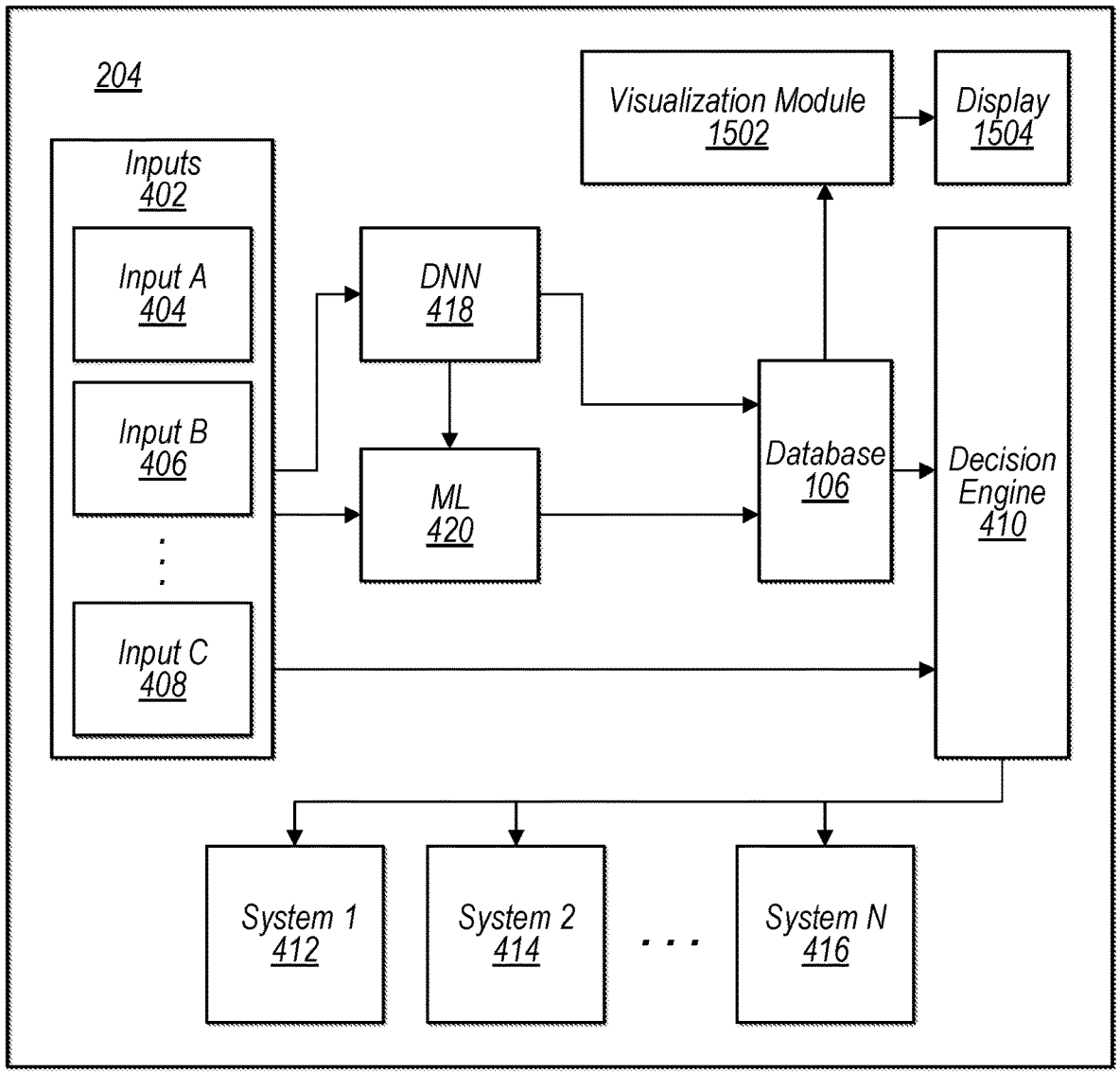
FIG. 15 is a block diagram of software components of a vehicle, wherein the software components include a rules of the road module and a rule visualization module, wherein actions determined by the rules of the road module may be visually presented to an occupant of a vehicle via the rule visualization module, according to some embodiments.

FIG. 15 is a block diagram of software components of a vehicle, wherein the software components include a rules of the road module and a rule visualization module, wherein actions determined by the rules of the road module may be visually presented to an occupant of a vehicle via the rule visualization module, according to some embodiments.

In some embodiments, a vehicle 204 may further include a rule visualization module 1502 and a display 1504, wherein rules of the road module and database 106 additionally provides a determined driving rule to the rule visualization module 1502 for presentation to an occupant of the vehicle. For example, display 1504 is an interior display in the vehicle and presents an occupant of a vehicle with a determined driving rule. Such a display may present a left turn arrow and text indicating that the vehicle plans to turn left, but is stopping or slowing to yield to oncoming traffic. More generally, the information presented may include an intended vehicle function, such as a change in direction or speed that is planned but not yet executed. Optionally, the information includes an explanation of the reason for delay in executing the planned function, such as waiting for oncoming traffic to clear. Optionally, the information includes a cause of the delay, such as an identification of a specific object (e.g., a vehicle, pedestrian, bicycle) that has a superior priority and is causing vehicle 204 to wait.

Optionally, the information includes a planned motion path, such as an identification of which one of lanes 1116, 1118, or 1120 vehicle 204 plans to take after making U-turn 1402 as described with reference to FIG. 14. Optionally, the information includes an estimated time to performance of the planned vehicle function. Such a visualization may provide confirmation to the occupant of the vehicle.

Figure 16:
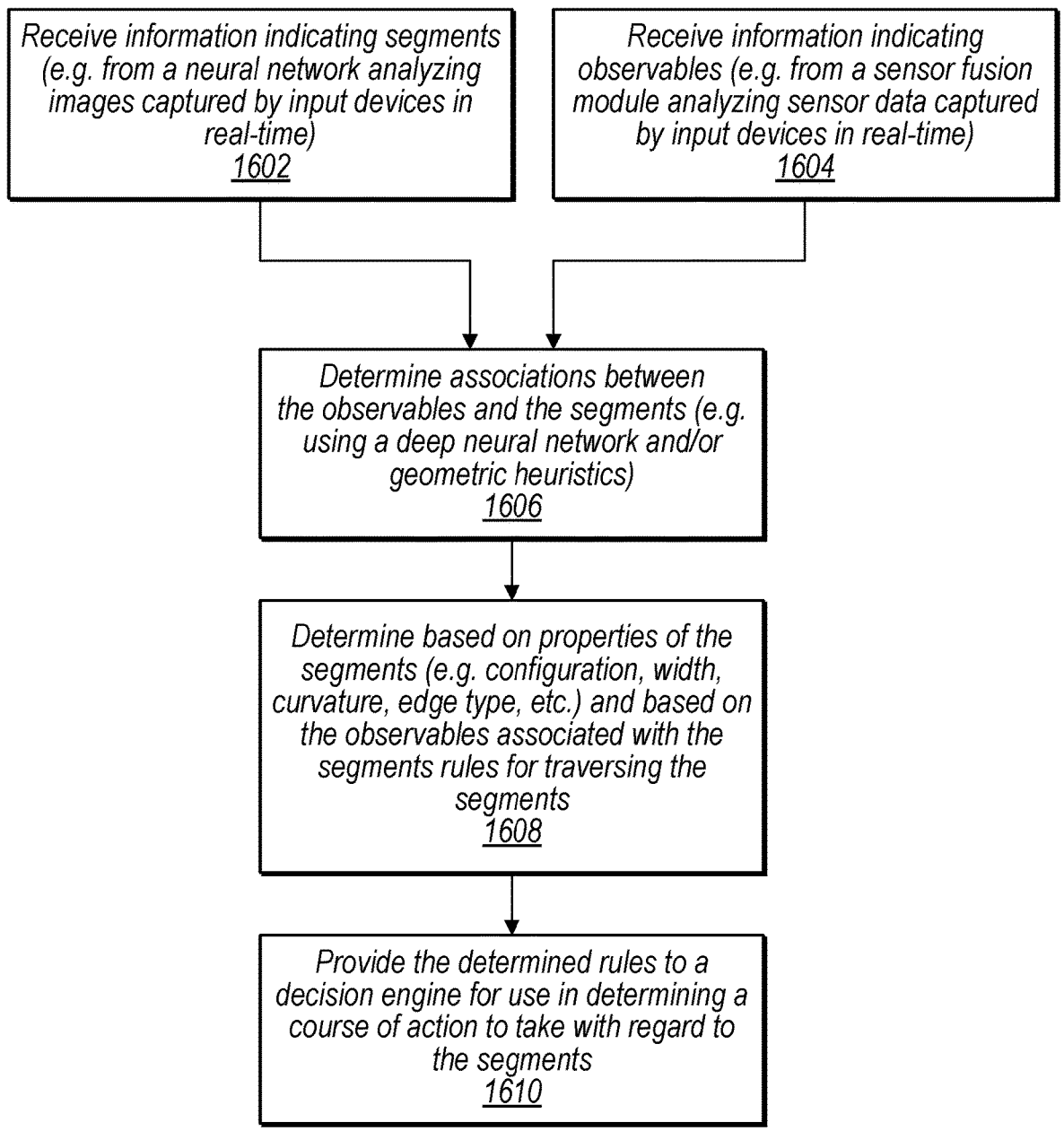
FIG. 16 is a flow diagram illustrating a process for determining rules of the road locally at a vehicle based on received lane segments and received observables, according to some embodiments.

Example Processes for Determining Turning Classifications, Relative Priorities, and Driving Rules FIG. 16 is a flow diagram illustrating a process for determining rules of the road locally at a vehicle based on received lane segments and received observables, according to some embodiments. At block 1062, a rules of the road module receives information indicating lane segments, such as from a neural network of a vehicle that analyzes captured images or other sensor data in real-time or near real-time. Also, at block 1604, the rules of the road module receives information indicating observables, wherein the information may have been generated by the deep neural network and/or a sensor fusion module of the vehicle that analyzes sensor data from a plurality of sensors and matches up the sensor data with image data or other outputs from the deep neural network. At block 1606, the rules of the road module determines associations between the observables and the lane segments, for example using a deep neural network that learns the associations and/or using a geometric heuristic technique that considers relative distances and orientations between lane segments and observables. At block 1608, the rules of the road module applies the determined characteristics of the lane segments and associated observables to known deterministic rules, such as may be provided from the department of motor vehicles, to determine driving rules for the particular situation. Additionally, or alternatively, the rules of the road module may infer driving rules based on the configurations, edge connections, associated observables, etc. for the lane segments. At block 1610, the rules of the road module provides the determined driving rules to a decision engine for use in determining a course of action to take with regard to the lane segments.

Figure 17A:
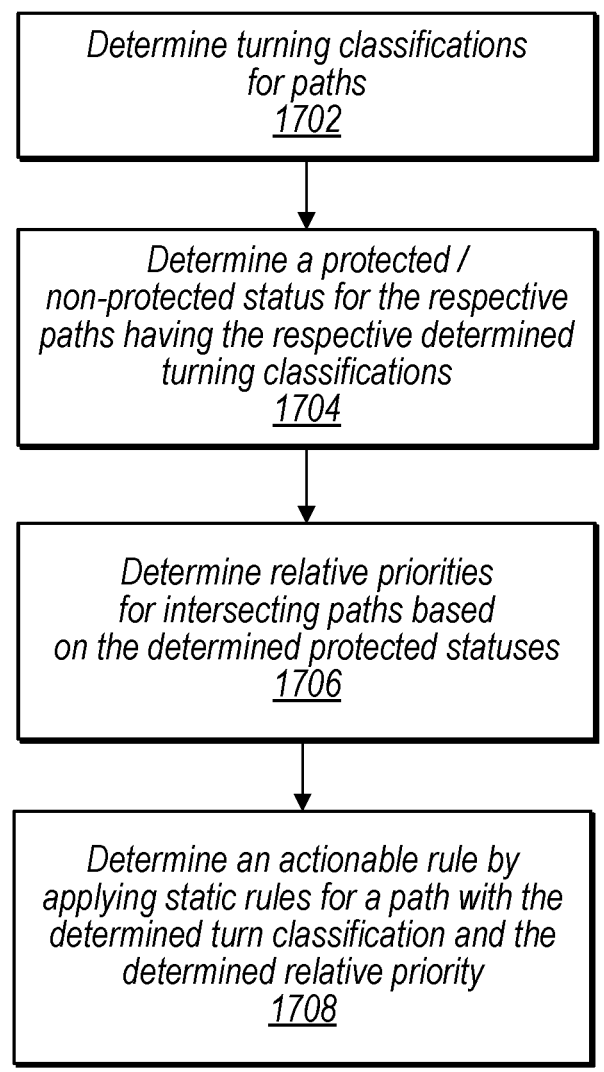
FIG. 17A is a flow diagram illustrating a process for determining relative path priorities and driving rules through an intersection locally at a vehicle based on received lane segments and received observables, according to some embodiments.

FIG. 17A is a flow diagram illustrating a process for determining relative path priorities and driving rules through an intersection locally at a vehicle based on received lane segments and received observables, according to some embodiments. At block 1702, a rules of the road module determines turning classifications for paths through an intersection. For example, a machine learning algorithm of the rules of the road module may learn turning classifications for intersections based on input and output configurations, lane segment configurations and orientations, observables associated with the intersecting lane segments, etc. At block 1704, the rules of the road module determines protected/non-protected statuses for intersecting paths through an intersection having the determined turning classifications. For example, protected statuses may also be learned by a machine learning algorithm based on input and output configurations, lane segment configurations and orientations, observables associated with the intersecting lane segments, etc. At block 1706, the rules of the road module applies the relative priorities to deterministic driving rules, such as may be stored in stored deterministic driving rules depository 310. The application of the determined relative priorities to the deterministic driving rules may yield situation specific driving rules to be taken by the vehicle. Thus, at block 1708 driving rules specific to the current situation of the vehicle may be determined.

Figure 17B:
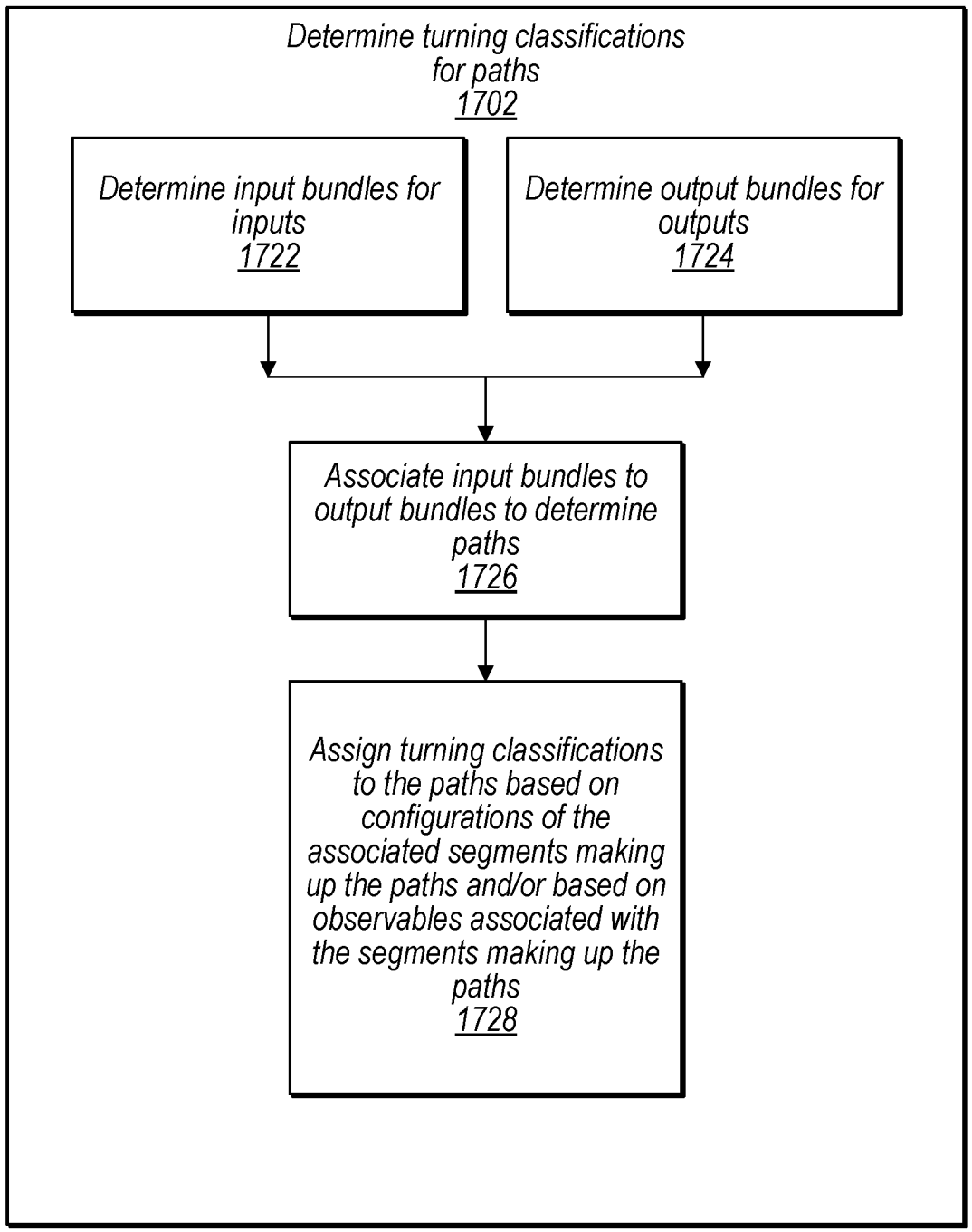
FIG. 17B is a flow diagram illustrating an example process for determining turning classifications, according to some embodiments.

FIG. 17B is a flow diagram illustrating an example process for determining turning classifications, according to some embodiments. In some embodiments, determining turning classifications at block 1702 may comprise determining, at block 1722, inputs bundles for inputs into the intersection and determining, at block 1724, output bundles for outputs from the intersection. Furthermore, at block 1726, the rules of the road module may associate determined input bundles with determined output bundles to determine paths through the intersection. At block 1728, the rules of the road module assigns turning classifications to the paths based on configurations of the associated lane segments making up the paths and/or based on observables associated with the lane segments making up the paths (e.g., road markings, signs, etc.).

Figure 17C:
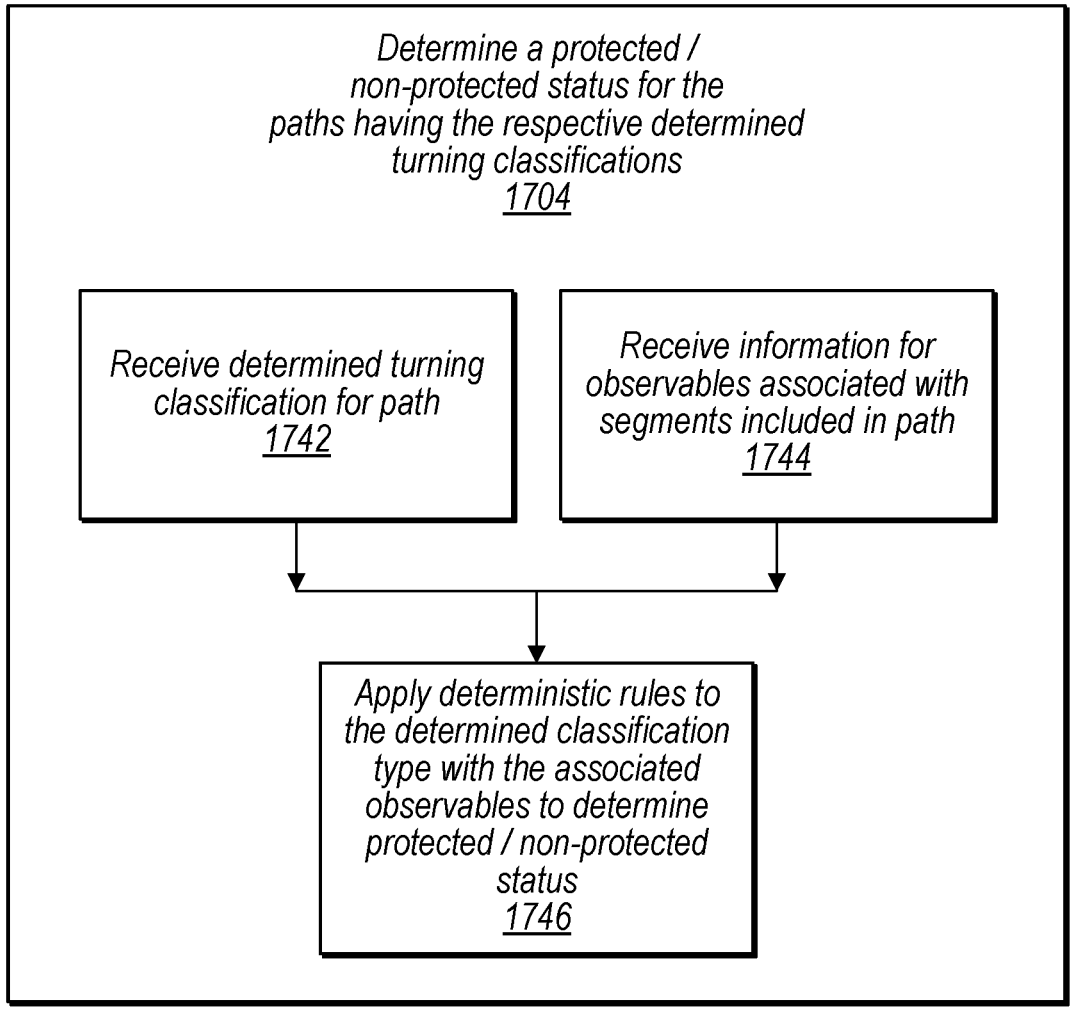
FIG. 17C is a flow diagram illustrating an example process for determining a protected/non-protected status for a path having a given turning classification, according to some embodiments.

FIG. 17C is a flow diagram illustrating an example process for determining a protected/non-protected status for a path having a given turning classification, according to some embodiments. In some embodiments, determining a protected/non-protected status includes, at block 1742, receiving a determined turning classification and, at block 1744, receiving information for observables associated with lanes segments included in path. Additionally, at block 1746, deterministic rules are applied to the determined classification type with the associated observables to determine protected/non-protected status.

Figure 17D:
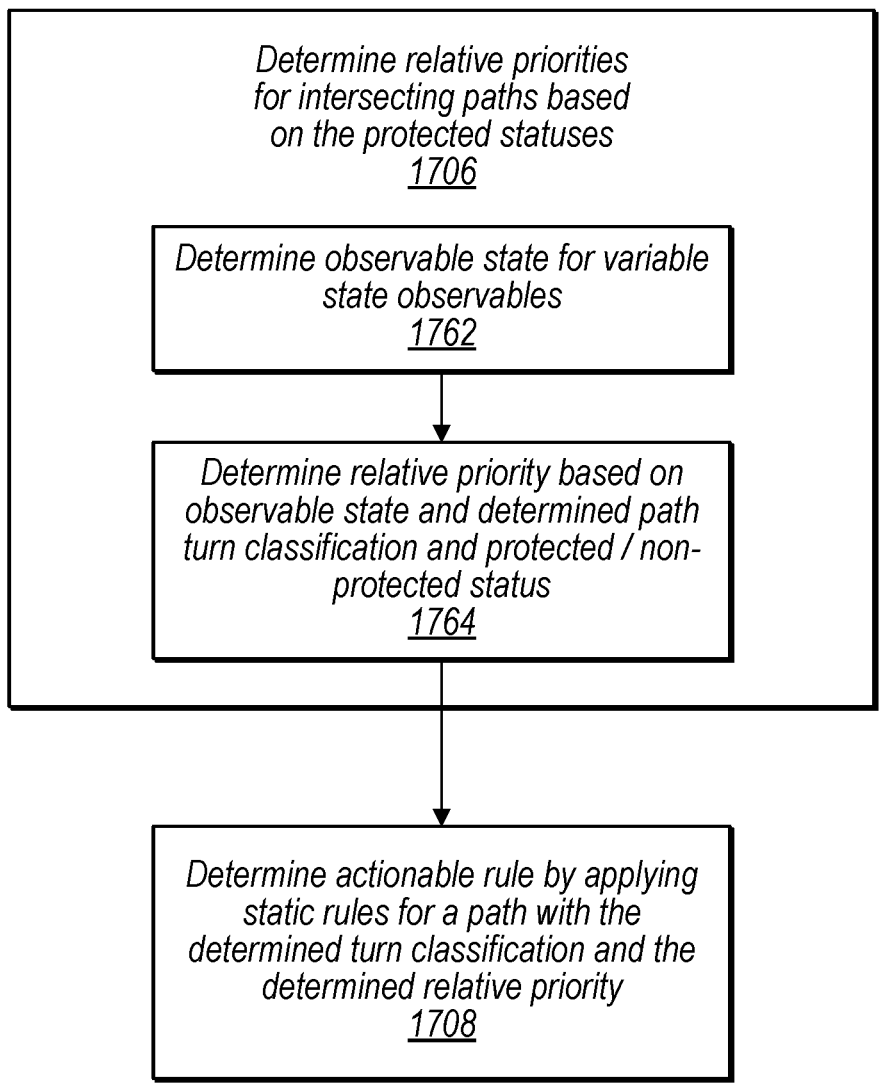
FIG. 17D is a flow diagram illustrating an example process for determining relative priorities for intersecting paths through an intersection, according to some embodiments.

FIG. 17D is a flow diagram illustrating an example process for determining relative priorities for intersecting paths through an intersection, according to some embodiments. In some embodiments, determining relative priorities for intersecting paths comprises determining, at block 1762, an observable state for a variable state observable. For example, for a traffic light, determining whether a current state of the traffic light is "red", "yellow", or "green." Also, at block 1764, a relative priority for a path is determined based on observable state and determined path turn classification and protected/non-protected status.

Example Computer System

Figure 18:
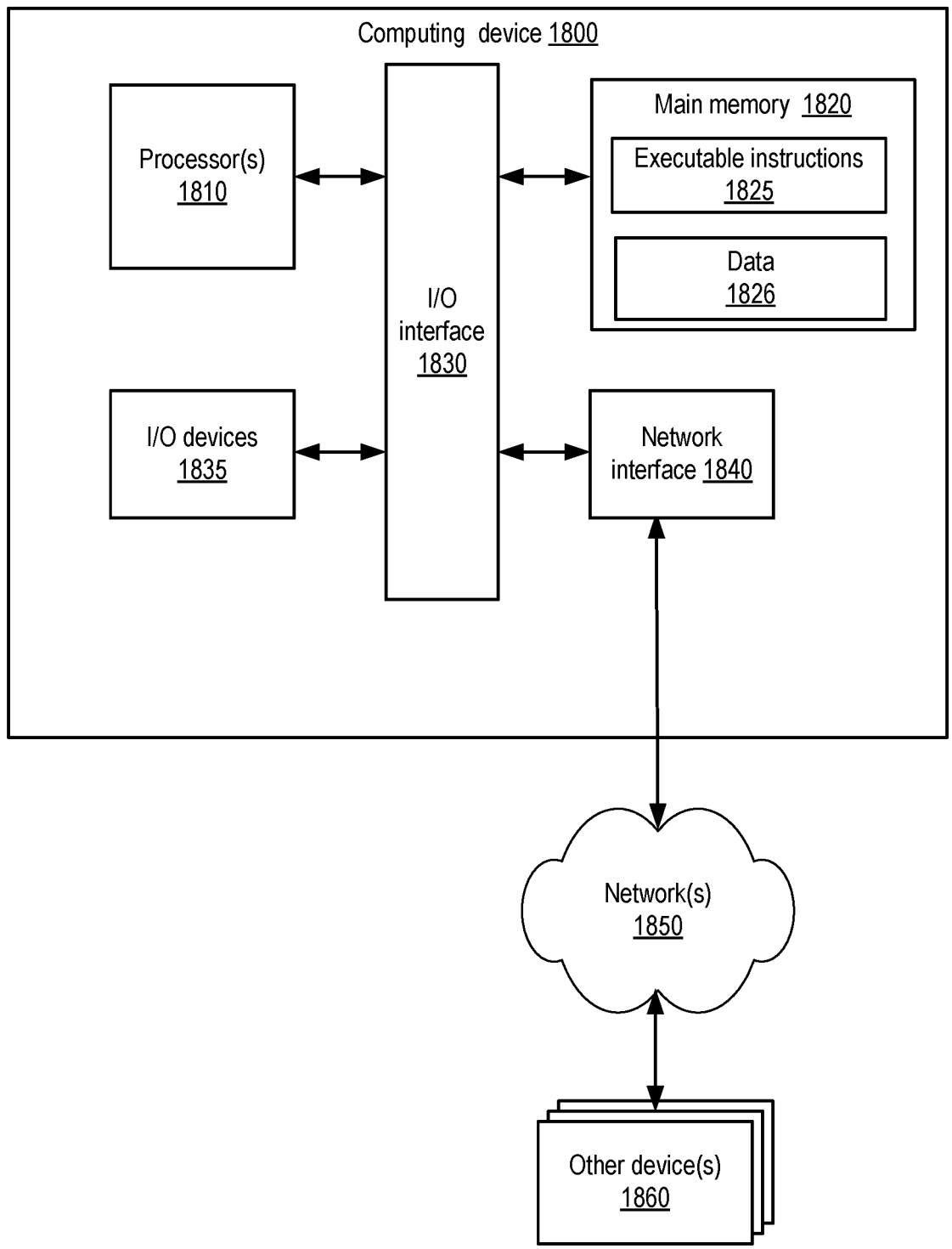
FIG. 18 is a block diagram illustrating an example computing device that may be used in at least some embodiments.

FIG. 18 illustrates a computing device 1800, which may be incorporated into a vehicle to perform at least some of the functionality described above, such as implementing a rules of the road module, implementing a deep neural network for identifying lane segments, implementing a deep neural network and/or sensor fusion module for identifying observables, implementing a decision engine for the vehicle, implementing a rules of the road visualization module, etc. In some embodiments, computing device 1800 may be included in an electronic control unit (ECU) of a vehicle. In the illustrated embodiment, computing device 1800 includes one or more processors 1810 coupled to a main memory 1820 (which may comprise both non-volatile and volatile memory modules, and may also be referred to as system memory) via an input/output (I/O) interface 1830. Computing device 1800 further includes a network interface 1840 coupled to I/O interface 1830, as well as additional I/O devices 1835 which may include sensors of various types, such as stereoscopic cameras, other cameras, LiDAR sensors, etc.

In various embodiments, computing device 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the ARM, x86, PowerPC, SPARC, or MIPS ISAs, or any other suitable ISA. In multiprocessor systems, each of processors 1810 may commonly, but not necessarily, implement the same ISA. In some implementations, graphics processing units (GPUs) may be used instead of, or in addition to, conventional processors.

Memory 1820 may be configured to store instructions and data accessible by processor(s) 1810. In at least some embodiments, the memory 1820 may comprise both volatile and non-volatile portions; in other embodiments, only volatile memory may be used. In various embodiments, the volatile portion of system memory 1820 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 1825 and data 1826 implementing one or more desired functions, such as those methods, techniques, and data described above, are shown stored within main memory 1820.

In one embodiment, I/O interface 1830 may be configured to coordinate I/O traffic between processor 1810, main memory 1820, and various peripheral devices, including network interface 1840 or other peripheral interfaces such as various types of persistent and/or volatile storage devices, sensor devices, etc. In some embodiments, I/O interface 1830 may perform any necessary protocol, timing or other data transformations to convert data signals from one component (e.g., main memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to memory 1820, may be incorporated directly into processor 1810.

Network interface 1840 may be configured to allow data to be exchanged between computing device 1800 and other devices 1860 attached to a network or networks 1850, such as other computer systems or devices as illustrated or discussed in regard to FIG. 1 through FIG. 17, for example. In various embodiments, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks such as Fibre Channel SANs, or via any other suitable type of network and/or protocol.

In some embodiments, main memory 1820 may be one embodiment of a computer-accessible medium configured to store program instructions and data as described above for FIG. 1 through FIG. 17 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1800 via I/O interface 1830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1800 as main memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using embedded systems, storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory, computer-readable, medium storing program instructions, that, when executed using one or more processors, cause the one or more processors to:
   receive information indicating one or more lane segments, wherein the one or more lane segments have been identified based on one or more pieces of sensor data captured using one or more sensors;
   receive information indicating one or more observables, wherein the one or more observables have been identified based on one or more of the pieces of sensor data;

determine associations between respective ones of the one or more lane segments and the one or more observables;

determine, based on the one or more lane segments and the one or more associated observables, driving rules for the respective one or more lane segments, wherein a driving rule for a given lane segment is determined based on one or more properties of the given lane segment and one or more observables associated with the given lane segment; and provide the determined driving rules for the respective one or more lane segments to a decision engine for use in determining a course of action to take with regard to the one or more respective lane segments.

2. The non-transitory, computer-readable, medium of claim 1, wherein:

the one or more sensors are included in a vehicle, and the information indicating the one or more lane segments and the information indicating the one or more observables are generated at the vehicle as the vehicle is travelling towards the one or more lane segments.

3. The non-transitory, computer-readable, medium of claim 2, wherein:

the decision engine is a decision engine for autonomously driving the vehicle, and the determined driving rules are provided to the decision engine of the vehicle as the vehicle is travelling towards the one or more lane segments.

4. The non-transitory, computer-readable, medium of claim 1, wherein to determine the driving rules for the one or more lane segments, the program instructions, when executed using the one or more processors, further cause the one or more processors to:

determine, for a set of intersecting lane segments, relative priorities for paths comprising respective ones of the lane segments with regard to proceeding through the intersecting lane segments; and include the determined relative priorities for the paths in the provided determined driving rules.

5. The non-transitory, computer-readable, medium of claim 4, wherein the one or more processors executing the program instructions are included in a vehicle, and wherein the determined relative priorities for the paths comprise:

a superior priority assigned to a given path indicating that the vehicle when travelling according to the given path has priority to proceed through the set of intersecting lane segments; or a subordinate priority assigned to a given path indicating that the vehicle when travelling according to the given path is to yield to another actor, if present, in a lane segment having a superior priority prior to proceeding through the set of intersecting lane segments.

6. The non-transitory, computer-readable, medium of claim 5, wherein the determined relative priorities for the paths further comprise:

a conditioned priority assigned to a given path indicating that the vehicle when travelling according to the given path is to stop and yield to other actors, if present, arriving at the intersecting lane segments prior to the vehicle proceeding through the set of intersecting lane segments.

7. The non-transitory, computer-readable, medium of claim 6, wherein the determined relative priorities for the respective ones of the lane segments further comprise:

a lack of priority assigned to a given path indicating that the vehicle when travelling according to the given path does not have priority to proceed through the set of intersecting lane segments based on current observables.

8. The non-transitory, computer-readable, medium of claim 4, wherein to determine the relative priorities for the paths with regard to proceeding through the intersecting lane segments, the program instruction when executed using the one or more processors, further cause the one or more processors to:

determine turning classifications for the respective ones of the paths, wherein the turning classifications are selected from a group comprising:

a straight path classification;

a left turn path classification;

a right turn path classification; and a U-turn path classification.

9. The non-transitory, computer-readable, medium of claim 6, wherein to determine the relative priorities for the paths with regard to proceeding through the intersecting lane segments, the program instruction when executed using the one or more processors, further cause the one or more processors to:

determine whether the determined turning classifications have a protected turning status based on one or observables associated with respective ones of the lane segments included in a respective path;

wherein the determined relative priorities for the respective paths is further based on whether the respective paths have a protected turning status.

10. The non-transitory, computer-readable, medium of claim 1, wherein the one or more processors executing the program instructions are included in a vehicle, and wherein the determined driving rules are further determined based on one or more deterministic rules associated with lane segment types or observable types stored in a memory of a computing device in the vehicle.

11. The non-transitory, computer-readable, medium of claim 1, wherein the one or more processors executing the program instructions are included in a vehicle, wherein the information indicating the one or more lane segments is received from a neural network executing on a computing device in the vehicle, and wherein the neural network identifies the one or more lane segments based on the pieces of sensor data that have been captured by a camera or sensor of the vehicle.

12. The non-transitory, computer-readable, medium of claim 1, wherein the one or more processors executing the program instructions are included in a vehicle, wherein the information indicating the one or more observables is received from a neural network and/or a sensor fusion module executing on a computing device in the vehicle, and wherein the neural network and/or the sensor fusion module identifies the one or more observables based on the pieces of sensor data that have been captured by a camera or sensor of the vehicle.

13. The non-transitory, computer-readable, medium of claim 1, wherein the one or more observables comprise one or more one of:

a traffic light;

a stop sign;

a sign indicating one or more driving rules; and painting on a surface of a roadway indicating one or more driving rules.

14. The non-transitory, computer-readable, medium of claim 1, wherein to determine associations between the respective ones of the one or more lane segments and the one or more observables, the program instructions, when executed using the one or more processors, further cause the one or more processors to:
  determine, using a deep neural network, associations between the one or more lane segments and the one or more observables using time-synchronized Lidar sensor data and captured image data; or
  apply geometric heuristics to time-synchronized Lidar sensor data and captured image data to learn associations between the one or more lane segments and the one or more observables based on:
    Euclidean distances between respective ones of the observables and respective ones of the lane segments; and
    orientations of the respective ones of the observables relative to the respective ones of the lane segments.

15. The non-transitory, computer-readable, medium of claim 1, wherein the program instructions, when executed using the one or more processors, further cause the one or more processors to:
  identify the one or more observables based the pieces of sensor data using a machine learning algorithm, wherein the machine learning algorithm is configured to:
    map sensor data to a 3D bounding box for a given observable; and
    assign to the 3D bounding box an observable type and an observable state based on the sensor data.

16. A method, comprising:
  receiving information indicating one or more lane segments, wherein the one or more lane segments have been identified based on one or more pieces of sensor data captured using one or more sensors;
  receiving information indicating one or more observables, wherein the one or more observables have been identified based on one or more of the pieces of sensor data;
  determining associations between respective ones of the one or more lane segments and the one or more observables;
  determining, based on the one or more lane segments and the one or more associated observables, driving rules for the respective one or more lane segments, wherein a driving rule for a given lane segment is determined based on one or more properties of the given lane segment and one or more observables associated with the given lane segment; and
  providing the determined driving rules for the respective one or more lane segments to a decision engine for use in determining a course of action to take with regard to the one or more respective lane segments.

17. The method of claim 16, further comprising:
  determining respective ones of the lane segments which have a previous and next lane segment relationship;
  joining respective ones of the lane segments that have the previous and next lane segment relationship to form a path comprising multiple lane segments; and
  determining driving rules for the path based on properties of one or more of the multiple lane segments and observables associated with one or more of the multiple lane segments.

18. The method of claim 17, further comprising:
  determining, for a set of intersecting lane segments, relative priorities for respective ones of the paths with regard to proceeding through the intersecting lane segments; and
  including the determined relative priorities for the set of intersecting paths in the provided determined driving rules for the one or more lane segments.

19. The method of claim 18, further comprising:
  bundling together paths through the intersecting lane segments that share a same turn classification,
  wherein said determining the relative respective priorities for the respective ones of the paths is performed such that bundled paths are evaluated as a bundle instead of being evaluated as separate paths through the intersecting lane segments.

20. A system, comprising:
  one or more computing devices storing program instructions, that when executed using one or more processors, cause the one or more processors to:
    receive information indicating one or more lane segments, wherein the one or more lane segments have been identified based on one or more pieces of sensor data captured using one or more sensors;
    receive information indicating one or more observables, wherein the one or more observables have been identified based on one or more of the pieces of sensor data;
    determine associations between respective ones of the one or more lane segments and the one or more observables;
    determine, based on the one or more lane segments and the one or more associated observables, driving rules for the respective one or more lane segments, wherein a driving rule for a given lane segment is determined based on one or more properties of the given lane segment and one or more observables associated with the given lane segment; and
    provide the determined driving rules for the respective one or more lane segments to a decision engine for use in determining a course of action to take with regard to the one or more respective lane segments.

21. The system of claim 20, further comprising:
  one or more cameras;
  one or more Lidar sensors,
  wherein the pieces of sensor data comprise sensor data captured via the one or more cameras and the one or more Lidar sensors; and
  one or more computing devices configured to implement a neural network,
  wherein the information indicating one or more lane segments and the information indicating one or more observables are received from the one or more computing devices configured to implement the neural network.

22. The system of claim 20, further comprising:
  an in-vehicle display device configured to render a visualization of the determined course of action.

* * * * *